(12) United States Patent
Flitcroft et al.

(10) Patent No.: US 7,571,142 B1
(45) Date of Patent: Aug. 4, 2009

(54) CREDIT CARD SYSTEM AND METHOD

(75) Inventors: Daniel I. Flitcroft, Sandycove (IE); Graham O'Donnell, Sandycove (IE)

(73) Assignee: Orbis Patents Limited, County Dublin (IE)

( * ) Notice: Subject to any disclaimer, the term of this patent is extended or adjusted under 35 U.S.C. 154(b) by 0 days.

(21) Appl. No.: 09/506,830

(22) Filed: Feb. 18, 2000

Related U.S. Application Data

(63) Continuation-in-part of application No. 09/235,836, filed on Jan. 22, 1999, now Pat. No. 6,636,833.

(60) Provisional application No. 60/147,153, filed on Aug. 4, 1999, provisional application No. 60/144,875, filed on Jul. 20, 1999, provisional application No. 60/134,027, filed on May 13, 1999, provisional application No. 60/120,747, filed on Feb. 18, 1999.

(51) Int. Cl.
*G06Q 40/00* (2006.01)

(52) U.S. Cl. ............................. 705/44; 705/38; 705/36; 705/35

(58) Field of Classification Search ................ 235/479, 235/379; 705/35–44; 455/406, 408; 307/36
See application file for complete search history.

(56) References Cited

U.S. PATENT DOCUMENTS

| | | | |
|---|---|---|---|
| 3,938,091 A | 2/1976 | Atalla et al. | |
| 4,423,316 A | 12/1983 | Sano et al. | |
| 4,707,592 A | 11/1987 | Ware | |
| 4,720,860 A | 1/1988 | Weiss | |
| 4,725,719 A | 2/1988 | Oncken et al. | |

(Continued)

FOREIGN PATENT DOCUMENTS

EP 0081921 6/1983

(Continued)

OTHER PUBLICATIONS

Visa, third parties add technology to protect shoppers and merchants Anonymous. Credit Card News. Chicago: Nov. 15, 2000. p. 1, 2 pgs.*

(Continued)

*Primary Examiner*—Frantzy Poinvil
*Assistant Examiner*—Clement Graham
(74) *Attorney, Agent, or Firm*—Buchanan Ingersoll & Rooney PC

(57) ABSTRACT

A credit card system is provided which has the added feature of providing additional limited use credit card numbers and/or cards. These numbers and/or cards can be used for a single or limited use transaction, thereby reducing the potential for fraudulent reuse of these numbers and/or cards. The credit card system finds application to "card remote" transactions such as by phone or Internet. Additionally, when a single use or limited use credit card is used for "card present" transactions, so called "skimming" fraud is eliminated. Various other features enhance the credit card system which will allow secure trade without the use of elaborate encryption techniques. Methods for limiting, distributing and using a limited use card number, controlling the validity of a limited use credit card number, conducting a limited use credit card number transaction and providing remote access devices for accessing a limited use credit card number are also provided.

18 Claims, 16 Drawing Sheets

U.S. PATENT DOCUMENTS

| | | | |
|---|---|---|---|
| 4,747,050 A | 5/1988 | Brachtl et al. | |
| 4,797,920 A | 1/1989 | Stein | |
| 4,856,062 A | 8/1989 | Weiss | |
| 4,941,090 A | 7/1990 | McCarthy | |
| 4,988,849 A | 1/1991 | Sasaki et al. | |
| 4,998,279 A | 3/1991 | Weiss | |
| 5,023,904 A | 6/1991 | Kaplan et al. | |
| 5,093,861 A | 3/1992 | Graham | |
| 5,097,505 A | 3/1992 | Weiss | |
| 5,117,355 A | 5/1992 | McCarthy | |
| 5,130,519 A | 7/1992 | Bush et al. | |
| 5,163,097 A | 11/1992 | Pegg | |
| 5,193,114 A | 3/1993 | Moseley | |
| 5,196,840 A | 3/1993 | Leith et al. | |
| 5,202,826 A | 4/1993 | McCarthy | |
| 5,239,583 A | 8/1993 | Parrillo | |
| 5,287,268 A | 2/1994 | McCarthy | |
| 5,317,636 A | 5/1994 | Vizcaino | |
| 5,323,338 A | 6/1994 | Hawthorne | |
| 5,326,960 A * | 7/1994 | Tannenbaum | 235/379 |
| 5,343,529 A | 8/1994 | Goldfine et al. | |
| 5,350,906 A * | 9/1994 | Brody et al. | 235/379 |
| 5,363,449 A | 11/1994 | Bestock | |
| 5,428,684 A | 6/1995 | Akiyama et al. | |
| 5,466,919 A | 11/1995 | Hovakimian | |
| 5,478,994 A | 12/1995 | Rahman et al. | |
| 5,479,494 A | 12/1995 | Clitherow | |
| 5,485,510 A | 1/1996 | Colbert | |
| 5,500,513 A | 3/1996 | Langhans et al. | |
| 5,504,808 A | 4/1996 | Hamrick, Jr. | |
| 5,555,497 A | 9/1996 | Helbing | |
| 5,577,109 A | 11/1996 | Stimson et al. | |
| 5,583,918 A | 12/1996 | Nakagawa | |
| 5,592,553 A | 1/1997 | Guski et al. | |
| 5,606,614 A | 2/1997 | Brady et al. | |
| 5,621,201 A | 4/1997 | Langhans et al. | |
| 5,627,355 A | 5/1997 | Rahman et al. | |
| 5,671,279 A | 9/1997 | Elgamal | |
| 5,677,955 A | 10/1997 | Doggett et al. | |
| 5,694,471 A | 12/1997 | Chen et al. | |
| 5,696,908 A | 12/1997 | Muehlberger et al. | |
| 5,715,314 A | 2/1998 | Payne et al. | |
| 5,721,768 A | 2/1998 | Stimson et al. | |
| 5,724,424 A | 3/1998 | Gifford | |
| 5,748,908 A | 5/1998 | Yu | |
| 5,757,917 A | 5/1998 | Rose et al. | |
| 5,768,381 A | 6/1998 | Hawthorne | |
| 5,777,305 A | 7/1998 | Smith et al. | |
| 5,777,306 A * | 7/1998 | Masuda | 235/375 |
| 5,825,881 A | 10/1998 | Colvin, Sr. | |
| 5,826,241 A | 10/1998 | Stein et al. | |
| 5,826,243 A | 10/1998 | Musmanno et al. | |
| 5,832,087 A | 11/1998 | Hawthorne | |
| 5,864,830 A | 1/1999 | Armetta et al. | |
| RE36,116 E | 2/1999 | McCarthy | |
| 5,868,236 A | 2/1999 | Rademacher | |
| 5,883,810 A * | 3/1999 | Franklin et al. | 235/379 |
| 5,890,137 A | 3/1999 | Koreeda | |
| 5,893,907 A | 4/1999 | Ukuda | |
| 5,903,830 A * | 5/1999 | Joao et al. | 455/406 |
| 5,903,878 A | 5/1999 | Talati et al. | |
| 5,953,710 A | 9/1999 | Fleming | |
| 5,956,699 A | 9/1999 | Wong et al. | |
| 5,984,180 A | 11/1999 | Albrecht | |
| 5,991,750 A | 11/1999 | Watson | |
| 6,000,832 A | 12/1999 | Franklin et al. | |
| 6,012,048 A | 1/2000 | Gustin et al. | |
| 6,029,890 A | 2/2000 | Austin | |
| 6,144,948 A * | 11/2000 | Walker et al. | 705/10 |
| 6,163,771 A | 12/2000 | Walker et al. | |
| 6,188,761 B1 | 2/2001 | Dickerman et al. | |
| 6,227,447 B1 | 5/2001 | Campisano | |
| 6,240,397 B1 | 5/2001 | Sachs | |
| 6,267,292 B1 | 7/2001 | Walker et al. | |
| 6,298,335 B1 | 10/2001 | Bernstein | |
| 6,324,526 B1 | 11/2001 | D'Agostino | |
| 6,339,766 B1 | 1/2002 | Gephart | |
| 6,341,724 B2 | 1/2002 | Campisano | |
| 6,343,279 B1 | 1/2002 | Bissonette et al. | |
| 6,352,205 B1 | 3/2002 | Mullins et al. | |
| 6,375,084 B1 * | 4/2002 | Stanford et al. | 235/384 |
| 6,422,462 B1 * | 7/2002 | Cohen | 235/381 |
| 6,598,031 B1 | 7/2003 | Ice | |
| 2002/0120587 A1 | 8/2002 | D'Agostino | |
| 2003/0097331 A1 | 5/2003 | Cohen | |
| 2003/0216997 A1 | 11/2003 | Cohen | |

FOREIGN PATENT DOCUMENTS

| | | |
|---|---|---|
| EP | 515448 | 12/1992 |
| EP | 0 590 861 | 4/1994 |
| EP | 590861 A2 | 4/1994 |
| EP | 590961 A3 | 1/1998 |
| FR | 2661996 | 11/1991 |
| GB | 2145265 | 3/1985 |
| GB | 2252270 | 8/1992 |
| GB | 2305393 | 4/1997 |
| GB | 2327831 | 2/1999 |
| GB | 2 361 790 A | 10/2001 |
| JP | 6-282556 | 10/1994 |
| JP | 6282556 | 10/1994 |
| WO | 91/12680 | 8/1991 |
| WO | 91/12693 | 8/1991 |
| WO | 93/14476 | 7/1993 |
| WO | 95/07512 | 3/1995 |
| WO | 96/08756 | 3/1996 |
| WO | 96/42150 | 12/1996 |
| WO | 97/15893 | 5/1997 |
| WO | 97/19549 | 5/1997 |
| WO | WO 98/26376 A2 | 6/1998 |
| WO | 98/30985 | 7/1998 |
| WO | 99/49424 | 9/1999 |

OTHER PUBLICATIONS

U.S. Appl. No. 09/235,836, filed Jan. 22, 1999, Daniel I. Flitcroft et al.

Web page for "Virtual Credit Card (VCC)" found at htp://www.geocities.com/Eureka/Park/5014/vcc.htm bearing the parent, putative date of Aug. 1998.

Kelpchpel et al "Shopping Models. A Flexible Architecture for Information Commerce" Library Project Working Paper SIDL-WP-199L0052, 1996.

Durbin, "ASTA Unit: No Active Status for SATO," Travel Weekly, Jan. 26, 1987, vol. 45, p. 92.

Jones, "ACE Server to Ship for NT," InfoWorld, Feb. 3, 1997, vol. 19, No. 5, p. 8.

Yamada, "Security Dynamics Plans to Launch Reseller Program," Computer Reseller News, Aug. 19, 1996, No. 697, p. 65.

Davis, "Vendors Put New Spin on Security Wares," Communications Week, Mar. 27, 1995, No. 549, p. 5.

"Security Dynamics & Cisco Offer 'Crackerfproof' Routers" Newsbytes News Network, Jun. 20, 1994.

Highland, "With Tokens, It's a New Password Everytime," Computerworld, Jun. 11, 1990, vol. 24, No. 24, pp. 88-89.

"Security Dynamics Expands Level of User Authentication for Internet Security," Business Wire, Mar. 27, 1995.

Brown, "TGV Launches Token-Based Security Ware," Communications Weeks, Oct. 31, 1994, No. 529, p. 4.

"CRYPTOCard 2: CRYPTOCard Enables Companies and ISPs to Secure Intranet Access with Authentication Tokens at Much Lower Costs," Business Wire, Jun. 19, 1998.

"Enigma Logic: Enigma Logic Introduces SafeWord SofToken," Business Editors & Computer Writers Jun. 1, 1994.

Owen Thomas, Money Changers, Moolah, "Online Cash," www.ecompany.com, Oct. 2000.

GE Capital Financial, Inc., "GE Pre-Authorization System," www.ge.com/capital/cardservices/corpcard/3pcard4.htm.

Morrall "Where the Card is King," Credit Card Management, p. 12, Sep. 1992.

Lamond, Credit Card Transaction Real World and Online, 1996, http://www.virtualschool.edu/mon/electronicproperty/clamond/creditcard.htm.

Wiggins, "Putting Risk in Perspective," http://www.webreference.com/outlook/column3/page4.html, 1997.

Crotch-Harvey, Electronic Money and the Law—The Implications, http://www.smartcard.co.uk/articles/electronicmoney/html.

B. Ives & M. Earl, Mondex International: Reengineering Money, http://isds.bus.isu.edu/cases/mondex.html, 1997.

V. Moscaritolo, Digital Commerce for the Rest of US Apple in a Geodesic Economy, http://www.shipwright.com/rants/rant_15.html, Sep. 4, 1996.

Herscheim, "Smart Card," http://disc.cba.uh.edu/~rhirsch/fall96/neepa.htm, Sep. 24, 1996.

NetChex: "NetChex Offers Secure Checking to the Web," http://ntrg.cs.tcd.ie/mepeirce/Project/Press/netchex.html, Jan. 1995.

Agora: "A minimal Distributed Protocol of Electronic Commerce," USENIX Workshop on Electronic Commerce, http://www.usenix.org/publications/library/proceedings/ec96/full_papers/grabber/html/ held from Nov. 18-21, 1996.

GE Capitol Financial, Inc., "Corporate E-Card and E-Commerce Glossary," http://www.ge.com/capital/cardservices/corpcard/5news5.html.

"NetChex—a short brief," http://www.tml.hut.fi/Studies/Tik-110.350/1997/Ecommerce/netchex_5.html, 1997.

"Announcement: Jan. 11, 1995 NetChex offers Secure Checking to the Web," http://ntrg.cs.tcd.ie/mepeirce/Project/Press/netchex.html, 1995.

* cited by examiner

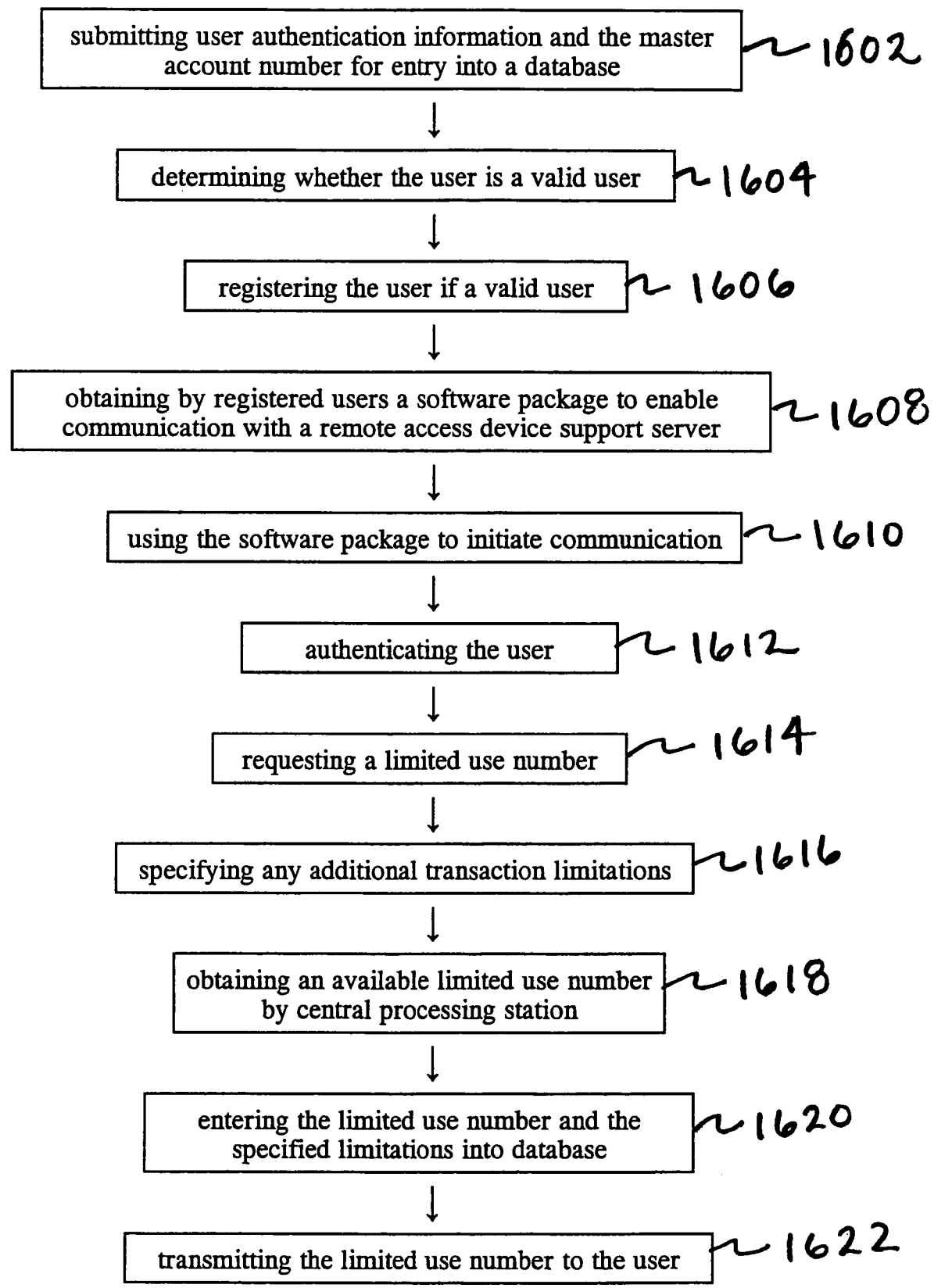

CREDIT CARD SYSTEM AND METHOD

This application is a continuation-in-part of U.S. Non-Provisional application Ser. No. 09/235,836 filed Jan. 22, 1999, and now U.S. Pat. No. 6,636,833. This application claims the benefit of U.S. Provisional Application No. 60/120,747 filed Feb. 18, 1999; U.S. Provisional Application No. 60/134,027 filed May 13, 1999; U.S. Provisional Application No. 60/144,875 filed Jul. 20, 1999 and U.S. Provisional Application No. 60/147,153 filed Aug. 4, 1999, the entire contents of each of which are incorporated by reference herein. This application also claims the benefit of Irish Patent Application No. S98 0458 filed Jun. 15, 1998; Irish Patent Application No. S98 0346 filed May 7, 1998; and Irish Patent Application No. S98 0223 filed Mar. 25, 1998, the entire contents of which are incorporated by reference herein.

BACKGROUND

1. Field of the Invention

This invention relates to a credit card system and method, and more particularly, to a credit card system and method offering reduced potential of credit card number misuse.

2. Related Art

The development of retail electronic commerce has been relatively slow in spite of the perceived demand for such trade. The single greatest deterrent to the expansion of retail electronic commerce is the potential for fraud. This potential for fraud has been a major concern for the credit card companies and financial institutions as well as the customers and the providers of the goods and services.

The former are concerned about fraud because essentially the financial institutions have to bear the initial cost of the fraud. Additionally, the credit card companies have an efficient credit card system which is working well for face to face transactions, i.e., "card present" transactions where the credit card is physically presented to a trader and the trader can obtain the credit card number, compare signatures and in many cases photographs before accepting a particular credit card.

The latter are equally concerned about fraud being well aware that ultimately the user must pay for the fraud. However, there are particular personal concerns for the consumer in that the fraudulent use of the credit card by misuse of the credit card number by a third party may not become apparent for some time. This can happen even if the card is still in his or her possession. Further, when fraud does occur the consumer has the task of persuading the credit card provider that fraud by another did indeed occur.

There is also the additional fear of being overcharged on a credit card. There are thus particular risks for those credit card holders who have relatively high spending limits, in that if fraud should occur, it may be some considerable time before it is detected. One particular form of fraud referred to as "skimming" is particularly difficult to control. What happens is that the card holder proffers his or her card at an establishment to make a transaction, the relevant information is electronically and/or physically copied from the card and the card is subsequently reproduced. This can be a particular problem with travelers particularly during an extensive period of travel as the fraudulent card may turn up in other places and it may be some considerable time before the fraud is detected.

For remote credit card use, the credit card holder has to provide details of name, master credit card number, expiration date and address and often many other pieces of information for verification; the storing and updating of the information is expensive but necessary. This of itself is a considerable security risk as anybody will appreciate that this information could be used to fraudulently charge goods and services to the card holder's credit card account. Such fraudulent use is not limited to those people to whom the credit card information has been given legitimately, but extends to anybody who can illegitimately obtain such details. A major problem in relation to this form of fraud is that the credit card may still be in the possession of the legitimate holder as these fraudulent transactions are taking place. This is often referred to as "compromised numbers" fraud. Indeed all this fraud needs is one dishonest staff member, for example in a shop, hotel or restaurant, to record the credit card number. It is thus not the same as card theft.

The current approaches to the limiting of credit card fraud are dependent on the theft of a card being reported and elaborate verification systems whereby altered patterns of use initiate some inquiry from the credit card company. Many users of credit cards have no doubt received telephone calls, when their use of the card has been exceptional, or otherwise unusual in the eyes of the organization providing the verification services.

Thus, there have been many developments in an effort to overcome this fundamental problem of fraud, both in the general area of fraud for ordinary use of credit cards and for the particular problems associated with such remote use.

One of the developments is the provision of smart cards which are credit card devices containing embedded electronic circuitry that can either store information or perform computations. Generally speaking they contribute to credit card security systems by using some encryption system. A typical example of such a smart card is disclosed in U.S. Pat. No. 5,317,636 (Vizcaino).

Another one of the developments is the Secure Electronic Transaction (SET) protocol which represents the collaboration between many leading computer companies and the credit card industry which is particularly related to electronic transmission of credit card details and in particular via the Internet. It provides a detailed protocol for encryption of credit card details and verification of participants in an electronic transaction.

Another method that is particularly directed to the Internet is described in U.S. Pat. No. 5,715,314 (Payne et al.). U.S. Pat. No. 5,715,314 discloses using an access message that comprises a product identifier and an access message authenticator based on a cryptographic key. A buyer computer sends a payment message that identifies a particular product to a payment computer. The payment computer is programmed to receive the payment message, to create the access message, and to send the access message to a merchant computer. Because the access message is tied to a particular product and a particular merchant computer, the access message can not be generated until the user sends the payment message to the payment computer. Because the access message is different from existing credit card formats, the access message is ill-suited for phone/mail orders and other traditional credit card transactions.

U.S. Pat. No. 5,883,810 (Franklin et al.) describes an online transaction system in which a user of the Internet or the like clicks on an icon to receive a proxy transaction number from a credit card provider. This proxy number stands in for the user's regular credit card number during transmission over the Internet, but expires after a short time (e.g., one hour) to reduce the chance that the number will be effectively intercepted and fraudulently used. The processing that occurs when a bank receives transaction information from a merchant involves checking whether the proxy number is a valid number and whether the transaction value and merchant match. There is no additional processing triggered when the bank processing system receives the proxy number. In addition, a significant drawback of the Franklin et al. system is that an unscrupulous merchant or a criminal who is capable of accessing or intercepting order details can then turn around and use the proxy number a number of times before the lapse of the expiration term. Thus, more than one transaction can occur within the duration of the expiration term. The Franklin et al. system has nothing in place to prevent this type of fraud. The Franklin et al. system merely depends upon an assumption that fewer criminals could obtain the proxy number and reuse it within the expiration term of the proxy transaction number set by the issuing bank than the total number of criminals capable of gaining access to credit card numbers used for online commerce. Also, the inclusion of specific transaction information does not prevent a fraudulent merchant from recurrent unauthorized charges within the expiry time of the proxy number. The user will not be aware of this misuse of his/her credit card details until the receipt of the statement, which will typically not be until several weeks later.

There are also specific electronic transaction systems such as "Cyber Cash," "Check Free" and "First Virtual." Unfortunately, there are perceived problems with what has been proposed to date. Firstly, any form of reliance on encryption is a challenge to those who will then try to break it. The manner in which access has been gained to extremely sensitive information in Government premises would make anyone wary of any reliance on an encryption system. Secondly, a further problem is that some of the most secure forms of encryption system are not widely available due to government and other security requirements. Limiting the electronic trading systems and security systems for use to the Internet is of relatively little use. In addition, entirely new electronic payment systems require changes in how merchants handle transactions and this represents an important commercial disadvantage for such systems.

Additionally, various approaches have been taken to make "card present" transactions more attractive. For instance, Japanese Patent Publication No. Hei 6-282556 discloses a one time credit card settlement system for use by, e.g., teenage children of credit card holders. This system employs a credit card which can be used only once in which various information such as specific personal information, use conditions, and an approved credit limit identical to those of the original credit card are recorded on a data recording element and displayed on the face of the card. The one-time credit card contains the same member number, expiration date, card company code, and the like as on existing credit card, as well as one-time credit card expiration date not exceeding the expiration date of credit card, available credit limit for the card, and the like. The one-time credit card makes use of some of the same settlement means as the conventional credit card. However, the system also requires use permission information to be recorded on the credit card, the information permitting the credit card to be used only once or making it impossible to use the credit card when the credit limit has been exceeded. A special card terminal device checks the information taken from the card for correctness and imparts use permission information for when the card is not permitted to be used on the transmission to the credit card issuing company. The use permission information takes the form of a punched hole on the card itself. This system has obvious drawbacks, such as the card terminal having to be modified for additional functions (e.g., punching holes, detected punched holes, imparting additional information, etc.). Also, such a system offers little additional security insofar as fraud can still be practiced perhaps by covering the holes or otherwise replacing the permission use information on the credit card. Further, such a system would require a change in nearly all card terminal equipment if it were adopted.

U.S. Pat. Nos. 5,627,355 and 5,478,994 (Rahman et al.) disclose another type of system that uses a plurality of pin numbers which are added to a credit card number on an electronic display. U.S. Pat. No. 5,627,355 discloses a credit card having a memory element containing a series of passwords in a predetermined sequence. These passwords are identical to another sequence stored in a memory of a host control computer. Further, the card contains a first fixed field containing an account number (e.g., "444 222 333"). In operation, the memory element of the credit card device provides a unique password from the sequence with each use of the credit card device. This permits verification by comparing the account number and the password provided with each use of the device with the account number and the next number in sequence as indicated by the host computer. The host computer deactivates the password after the transaction. Among the drawbacks with this type of system is the need for a power supply, a display, a memory device, a sound generator and the need to recycle a limited sequence of pin numbers. Such a system is not readily adapted to current credit card transactions because it lacks the ability of providing a check sum of the card number and cannot be read by a standard card reader. Also, if the card is lost or stolen, there is little to prevent a person from using the card until it is reported to be lost or stolen by the correct holder. See, also, U.S. Pat. No. 5,606,614 (Brady et al.).

Other attempts have been made to make funds available to an individual, but with limitations. For example, U.S. Pat. Nos. 5,350,906 (Brody et al.) and 5,326,960 (Tannenbaum et al.) disclose issuing temporary PINs for one time or limited time and limited credit access to an account at an ATM. These patents disclose a currency transfer system and method for an ATM network. In this system, a main account holder (i.e., the sponsor) sets up a subaccount that can be accessed by a non-subscriber by presenting a fixed limit card associated with the subaccount and by entering a password corresponding to the subaccount. Once the fixed limit is reached, the card can no longer be used. The fixed limit card contains information on its magnetic stripe pertaining to the sponsor account.

One of the problems with all these systems is that there are many competing technologies and therefore there is a multiplicity of incompatible formats which will be a deterrent to both traders and consumers. Similarly, many of these systems require modifications of the technology used at the point of sale, which will require considerable investment and further limit the uptake of the systems.

OBJECTS AND SUMMARY OF THE INVENTION

Many solutions have been proposed to the problem of security of credit card transactions. However, none of them allow the use of existing credit cards and existing credit card formats and terminal equipment. Ideally, as realized by the present inventors, the solution would be to obtain the functionality of a credit card, while never in fact revealing the master credit card number. Unfortunately, the only way to ensure that master credit card numbers cannot be used fraudulently is to never transmit the master credit card number by any direct route, i.e., phone, mail, Internet or even to print out the master credit card number during the transaction, such as is commonly the case at present.

According to exemplary embodiments of the present invention as described in the present inventor's earlier application (U.S. non-provisional application Ser. No. 09/235, 836), a more secure way of using existing credit cards and, in particular, using existing credit cards in remote credit card transactions was provided. The present invention is further directed towards providing a more secure way of using existing credit cards generally which will not require any major modifications to existing credit card systems. It is further directed towards providing a credit card system that will be user friendly and will provide customers with a greater confidence in the security of the system.

These and other advantages of the present invention are satisfied by a first exemplary embodiment, which pertains to a method used in a financial transaction system capable of using a limited use credit card number which is deactivated upon a use-triggered condition which occurs subsequent to assignment of said at least one credit card number and which is associated the master account number of a customer. The method controls the validity of the limited use credit card number and includes the steps of: sending to a customer from a limited use credit card number issuer a limited use credit card number which is not yet activated; receiving acknowledgment of delivery by the customer of the limited use credit card number which is not yet activated; communicating with a limited use card number card issuer to activate the card before it can be used in a transaction; and validating the limited use credit card to have associated limited use properties. These properties can be such things as a specific time period, a specific merchant, a specific group of merchants, a specific type of transaction, and a specific number of transactions.

The validation step can include activating validity limited credit card software using a user identification to identify the user with the card issuer; requesting validation of a limited use credit card for a merchant as identified by a merchant identification number; and providing an option for a user to specify additional limitations other than the specific merchant to the limitation on the limited use credit card number.

Additionally, the present invention provides a method of conducting a limited use credit card transaction, which includes initiating a transaction by a customer presenting a limited use credit card number to a merchant; routing said limited use credit card number to a central processing system; determining whether said limited use credit card number has been deactivated because the limited use condition has been satisfied; transmitting a signal to the merchant denying authorization of the card number if the credit card number has been deactivated; transmitting a signal to a master credit card issuing facility which issued that limited use credit card number, said signal including original transaction details but with the limited use credit card number remapped to be a master credit card number if said limited use credit card number has not been deactivated; determining at the whether authorization can be obtained against the master credit card number; authorizing or denying authorization of the transaction based on this determination; remapped any such authorization or denial to the limited use credit card number for transmission to the merchant; and transmitting a signal to the merchant authorizing or denying authorization of the limited use credit card number.

Further, the present invention provides a method of conducting a settlement transaction including transmitting a signal from a merchant to a central processing system according to a BIN of the limited use card number; remapping the limited use credit card number with the master credit card number; transmitting said remapped master credit card number to issuer processing facility which issued the master credit card number; settling the transaction by payment, if appropriate, to the central processing system; remapping the master credit card number back to the limited use credit card number; and transmitting the limited use credit card number and payment information, if appropriate, to the merchant.

Furthermore, the present invention includes a method of providing remote access devices for accessing limited use numbers. The method includes submitting user authentication information and the master account number for entry into a database; determining whether the user is a valid user of the master credit card number; registering the user if the user is determined to be a valid user; obtaining by registered users a software package to which enables communication with a remote access device support server to enable the issuance of limited use card numbers; using the software package to initiates communication with the remote access support server; authenticating the user at the remote access support server; requesting a limited use number by an authenticated user; specifying by the authenticated user any additional transaction limitations desired; obtaining an available limited use number; entering the limited use number and the specified limitations into the database such that the limited use number is associated with the user's information already in database; and transmitting the limited use number to the user.

In this way, a merchant can receive a limited use credit card number; process the received limited use credit card number in a transaction as any other credit card number; pass the transaction through to the card issuer's processing system; and request authorization of the transaction at the card issuer's processing system against the associated limited use properties. The system can then deactivate the limited use credit card number by the card issuer when a use-triggered condition is present. Also, limited use transaction numbers can be obtained by authorized users and transactions can be processed within the existing credit card system with only minor modifications.

BRIEF DESCRIPTION OF THE DRAWINGS

The foregoing, and other, objects, features and advantages of the present invention will be more readily understood upon reading the following detailed description in conjunction with the drawings in which:

FIG. 16 is a flow chart illustrating an exemplary method of providing remote access devices for accessing limited use credit card numbers.

DETAILED DESCRIPTION

Figure 1:
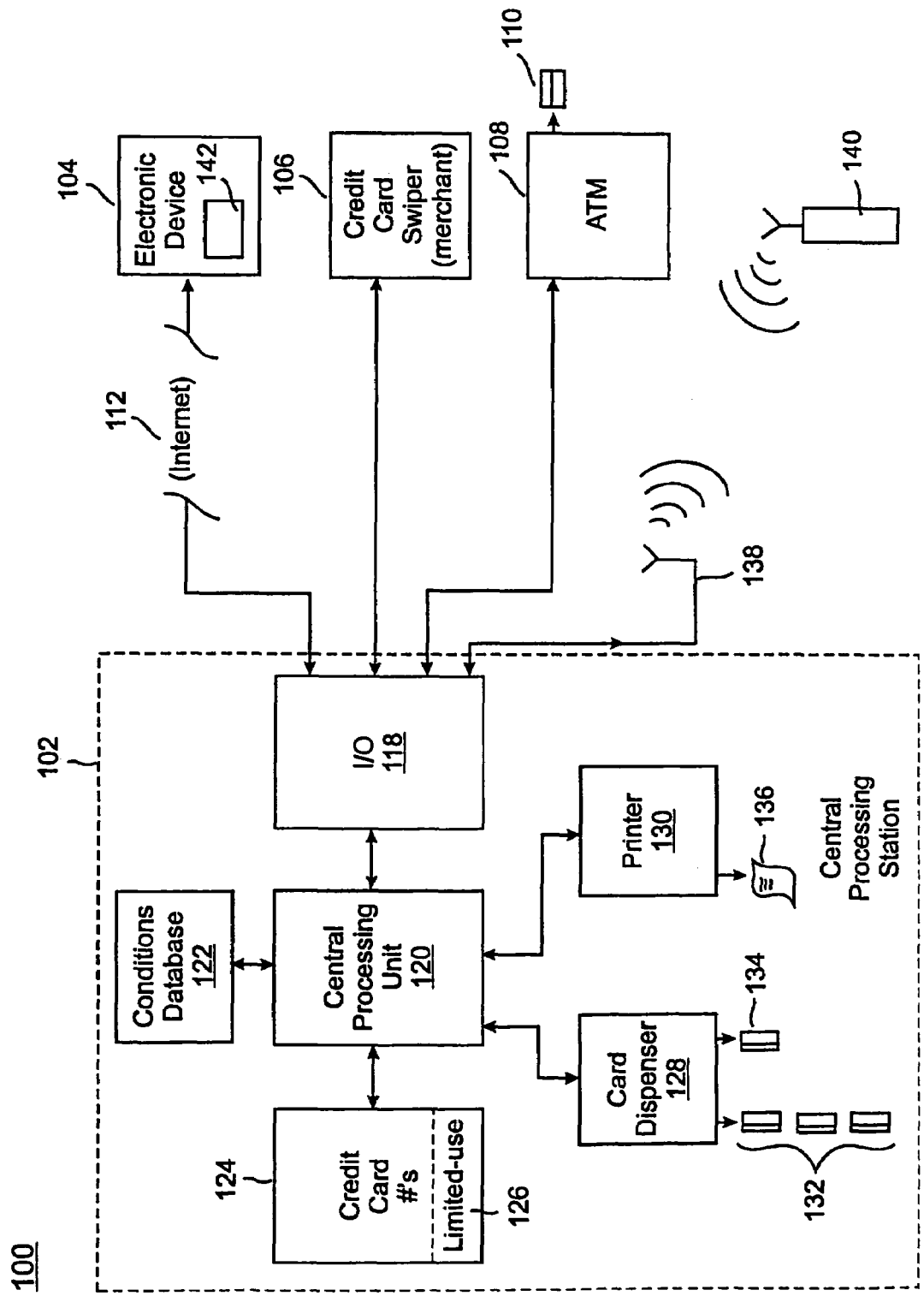
FIG. 1 shows an exemplary system for implementing the present invention.

In this specification the term "credit card" refers to credit cards (MasterCard®, Visa®, Diners Club®, etc.) as well as charge cards (e.g., American Express®, some department store cards), debit cards such as usable at ATMs and many other locations or that are associated with a particular account, and hybrids thereof (e.g., extended payment American Express®, bank debit cards with the Visa® logo, etc.). Also, the terms "master credit card number" and "master credit card" refer to the credit card number and the credit card as generally understood, namely, that which is allocated by the credit card provider to the customer for his or her account. It will be appreciated that an account may have many master credit cards in the sense of this specification. For example, a corporation may provide many of its employees with credit cards but essentially each of these employees holds a master credit card even if there is only one customer account. Each of these master credit cards will have a unique master credit card number, which set of master credit card numbers will be linked to the account. Similarly, in families, various members of the family may hold a master credit card, all of which are paid for out of the one customer account.

Additionally, the "master credit card" account can be in some embodiments something other than a credit card account. For instance, while not otherwise affecting the formatting or processing of the limited use credit card numbers as described herein, the master card number can be a prepaid account or another type of account, such as a utility, telephone service provider or Internet Service Provider (ISP) account. The utility company, telephone company, ISP or other account holder would generate a bill, which, in possible addition to or separate from to the regular bill, would include a listing of limited use credit card transactions. An advantage of this type of arrangement is that the service provider already has information as to a pool of individual and their credit worthiness, as well as low increased overhead due to the already in place billing system. In these embodiments, the "master account" may but likely does not have the format of a standard credit card or the like.

The term "limited-use" credit card number is used to encompass at least both the embodiment in which the credit card is designated for a single use, and the embodiment in which the credit card is designated for multiple uses providing that the charges accrued do not exceed a prescribed threshold or thresholds, such a total single charge, total charges over a limited time period, total charge in a single transaction, etc. A common feature is that the limitation is based on a use-triggered condition subsequent, and not just the expiration date of the card. Stated differently, the a limited-use credit card number is deactivated upon a use-triggered condition which occurs subsequent to assignment of said at least one credit card number.

The terms "card holder" and "user" are used interchangeably to refer to an entity, e.g., an individual, that has been rightfully issued a credit/debit/charge card number, e.g., through a contractual arrangement, or that has been authorized to use such card by such entity or a representative of such entity.

1. Overview of System Features

There are at least two basic different ways of carrying out the present invention. In summary, they are the allocation of additional credit card numbers for remote trade and secondly the provision of what are effectively disposable credit cards for remote and card present trade, both of which have the feature of in the case of single use or in the case of multiple use, protecting against the worst effects of compromised numbers fraud or skimming.

In a refinement of the invention, it is possible to control the manner in which an actual transaction is carried out as a further protection against unscrupulous providers of goods and services.

Essentially, there are certain matters that will be considered in relation to this invention. They are firstly the operational or functional features in so far as they affect customers, and then there are the technical features, namely how the invention is implemented, how the invention is provided to the customers, and finally, how the invention is handled by the providers of goods and services and the processors of the credit cards, i.e., the financial institutions and/or their service providers.

The operational or functional features of this invention will be discussed first in the context of a standard credit card system.

One basic feature of the invention is to provide in a credit card system such that each master credit card holder could be provided with one or more of the following: 1) additional single use credit card numbers for remote transactions; 2) multiple use credit card numbers for remote transactions; 3) single use additional credit cards for remote and card present transactions; and 4) multiple use credit cards for remote and card present transactions.

It is also envisaged that in certain situations credit cards can be provided to people who do not have an account with any credit card company. This latter feature is described in more detail below. Various other features may be provided in the above situations, which will further improve the security of credit card transactions.

Dealing firstly with the situation where a master credit card holder has an additional credit card number allocated to him or her for a single use, it will be appreciated that since the number can only be used for one single transaction, the fact that the number is in anybody else's hands is irrelevant as it has been deactivated and the master credit card number is not revealed to the third party. Various other features may be added to such single use credit card numbers, for example, the value of the transaction can be limited, thus the master credit card holder can have a plurality of single use credit card numbers of differing values. For example, when a remote trade is carried out, the master credit card holder will use a credit card number which has a credit card limit only marginally above or equal to that of the value of the transaction. This would reduce the chances of or prevent an unscrupulous trader using the credit card number to supply additional goods or services over those ordered or to increase the agreed charge.

A second embodiment of the invention provides the master credit card holder with an additional credit card number for use in remote trade, which credit card number could have, as in the previous example of the invention, a credit limit for each specific transaction or a credit limit such that when the aggregate amount of a series of transactions exceeded a specific credit limit that the credit card number would be canceled, invalidated or in some other way deactivated. Similarly, the multiple use credit card number could be limited to, for example, five uses with a credit limit not exceeding $100 in each transaction and an aggregate credit limit not exceeding $400. Similarly, a time restriction could be put on such a credit card number in that it would be deactivated if it was used with frequency above (or below) a given threshold, for example, more than once a week. It will be appreciated that the limits that can be placed on the use of a single use credit number or a multiple use credit card number are almost limitless and those having skill in the art will consider other ways in which the use of the credit card number could be limited, whether it be by time, by amount, frequency of use, by geographical region, by merchant, by merchant class, or by purpose or use (such as limited to Internet trade and so on), or by some combination of these separate criterion.

The third way in which the invention could be carried out is by physically providing additional single use credit cards each of which would have a unique additional credit card number. Such additional single use credit cards could then be used both for remote trade by using the additional credit card numbers for respective transactions, and for "card present" trade where each card would be "swiped" in the normal manner. Such a disposable credit card could be made like any common credit card, or from a relatively inexpensive material, such as cardboard or thin plastic, with the relevant information entered into it in readable (e.g., magnetic) form, as is already the case with many forms of passes for use in public transport and the like. Again, substantially the same features as with the credit card number could be provided. Thus, for example, the disposable credit card could be limited to use geographically, to a use, to an amount, to a frequency of use, to an expiration date, and so on. Again, those skilled in the art will appreciate that there are many variations to this concept.

Another way of carrying out the invention is to provide a master credit card holder with a multiple use additional credit card, where the additional credit card provides any limitations as to use triggered conditions subsequent that may be desired.

Ideally, irrespective of the manner in which the invention is carried out, the master credit card holder would be provided with either a plurality of single use additional credit card numbers or multiple use credit card numbers or a mixture of single and multiple use credits cards.

It will be appreciated that with either single use credit card numbers or single use additional credit cards, it is possible to eliminate or reduce the risk of credit card number fraud. Further, depending on the credit limit imparted to the particular credit card number or additional credit card number or single use additional credit card, it is possible to further limit the possibilities of fraud in any remote transaction and that with the use of a disposable single use credit card it is possible to eliminate or reduce the risk of skimming.

With multiple use additional credit card numbers and multiple use additional credit cards, the above-identified problems may not be totally eliminated due to preferences of the user. This is because, in certain circumstances, credit card users may prefer to have, for example, an additional credit card number for remote trade with a specific credit limit that they use all the time and are willing to take the risk of compromised number fraud, in the sense that they can control the severity of this misuse. This would be particularly the case where some of the various user triggered conditions subsequent limitations suggested above are used with the additional credit card number. Substantially the same criteria would apply to an additional multiple use credit card.

Effectively, the present invention solves the problem by obtaining the functionality of a credit card while never in fact revealing the master credit card number as the master credit card number need never be given in a remote transaction. Further, the master credit card itself need never be given to a trader.

In another embodiment of the invention, it is envisaged that people who do not hold master credit cards could purchase disposable credit cards which would have a credit limit for the total purchases thereon equal to the amount for which the credit card was purchased. These could then be used for both card present and card remote trade, the only proviso being that if the credit limit was not reached it will then be necessary for a refund to be given by the financial institution or credit card provider. An obvious way of obtaining such a refund would be through an automatic teller machine (ATM). In this way, the existing credit card transaction system is employed and the card holder is given the convenience of having a credit card.

As an alternative, the above-discussed cards could be, in effect, debit cards in the true sense, in which funds are withdrawn against a customer's account. In this case, the "credit card" issued, whether it be a one time use card or multi-use card, and whether have a credit limit or not, would be used to debit the account immediately. Preferably, the credit card issued in these circumstances would be single use with or without a transaction amount limit which would be used and processed by the customer and merchant for a transaction as if it were a credit card, while in the customer's bank it would be treated like any other debit to the account.

2. Exemplary Implementation 2.1 Implementation Overview

Various aspects of the invention may be embodied in a general purpose digital computer that is running a program or program segments originating from a computer readable or usable medium, such medium including but not limited to magnetic storage media (e.g., ROMs, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

FIG. 1 shows an exemplary overview of a system for implementing the limited use credit card system of the present invention. The system 100 comprises a central processing station 102, which, accordingly to exemplary embodiments, may be operated by the credit card provider. Generally, this station 102 receives and processes remotely generated credit card transactions. The credit card transactions can originate from a merchant in the conventional manner, e.g., by swiping a credit card through a card swipe unit 106. Alternatively, the credit card transaction requests can originate from any remote electronic (e.g., a personal computer) device 104. These remote devices can interface with the central processing station 102 through any type of network, including any type of public or propriety networks, or some combination thereof. For instance, the personal computer 104 interfaces with the central processing station 102 via the Internet 112. Actually, there may be one or more merchant computer devices (not shown) which receive credit card transactions from the remote electronic device 104, and then forward these requests to the central processing station 102. The central processing station 102 can also interface with other types of remote devices, such as a wireless (e.g., cellular telephone) device 140, via radiocommunication using transmitting/receiving antenna 138.

The central processing station 102 itself may include a central processing unit 120, which interfaces with the remote units via network I/O unit 118. The central processing unit 120 has access to a database of credit card numbers 124, a subset 126 of which are designated as being available for limited use (referred to as the "available range"). Also, the central processing unit 120 has access to a central database 122, referred to as a "conditions" database. This database is a general purpose database which stores information regarding customers' accounts, such as information regarding various conditions which apply to each customers' account. Further, this database 122 may store the mapping between a customer's fixed master credit card number and any outstanding associated limited use credit cards, using, for instance, some type of linked-list mechanism. Databases 122 and 124 are shown separately only to illustrate the type of information which may be maintained by the central processing station 102; the information in these databases can be commingled in a common database in a manner well understood by those having skill in the data processing arts. For instance, each limited use credit card number can be stored with a field, which identifies its master account, and various conditions regarding its use.

The central processing unit 120 can internally perform the approval and denial of credit card transaction requests by making reference to credit history information and other information in the conventional manner. Alternatively, this function can be delegated to a separate clearance processing facility (not shown).

Finally, the central processing station includes the capability of transmitting the limited use credit card numbers to customers. In a first embodiment, a local card dispenser 128 can be employed to generate a plurality of limited use cards 132 and/or a master credit card 134 for delivery to a customer. In a second embodiment, the limited use credit card numbers can be printed on a form 136 by printer 130, which is then delivered to the customer via the mail. The printed form 136 may include material which covers the numbers until scratched off, thereby indicating what numbers have been used and are no longer active. This listing of numbers can be included in a monthly or other periodic account statement sent to the customer. In a third embodiment, these limited use numbers can be electronically downloaded to a user's personal computer 104, where they are stored in local memory 142 of the personal computer 104 for subsequent use. In this case, the credit card numbers can be encrypted (described in detail later). Instead of the personal computer 104, the numbers can be downloaded to a user's smart card though an appropriate interface. In a fourth embodiment, the single-use credit card numbers can be downloaded to a radio unit 140 (such as a portable telephone) via wireless communication. In a fifth embodiment, an ATM 108 can be used to dispense the limited use cards 110. Those skilled in the art will readily appreciate that other means for conveying the numbers/cards can be employed. These embodiments are, of course, usable together.

The logic used to perform the actual allocation and deactivation of limited use credit card numbers preferably comprises a microprocessor, which implements a stored program within the central processing unit 120. Any general or special purpose computer will suffice. In alternative embodiments, the logic used to perform the allocation and deactivation of the limited use credit card numbers may comprise discrete logic components, or some combination of discrete logic components and computer-implemented control.

Figure 2:
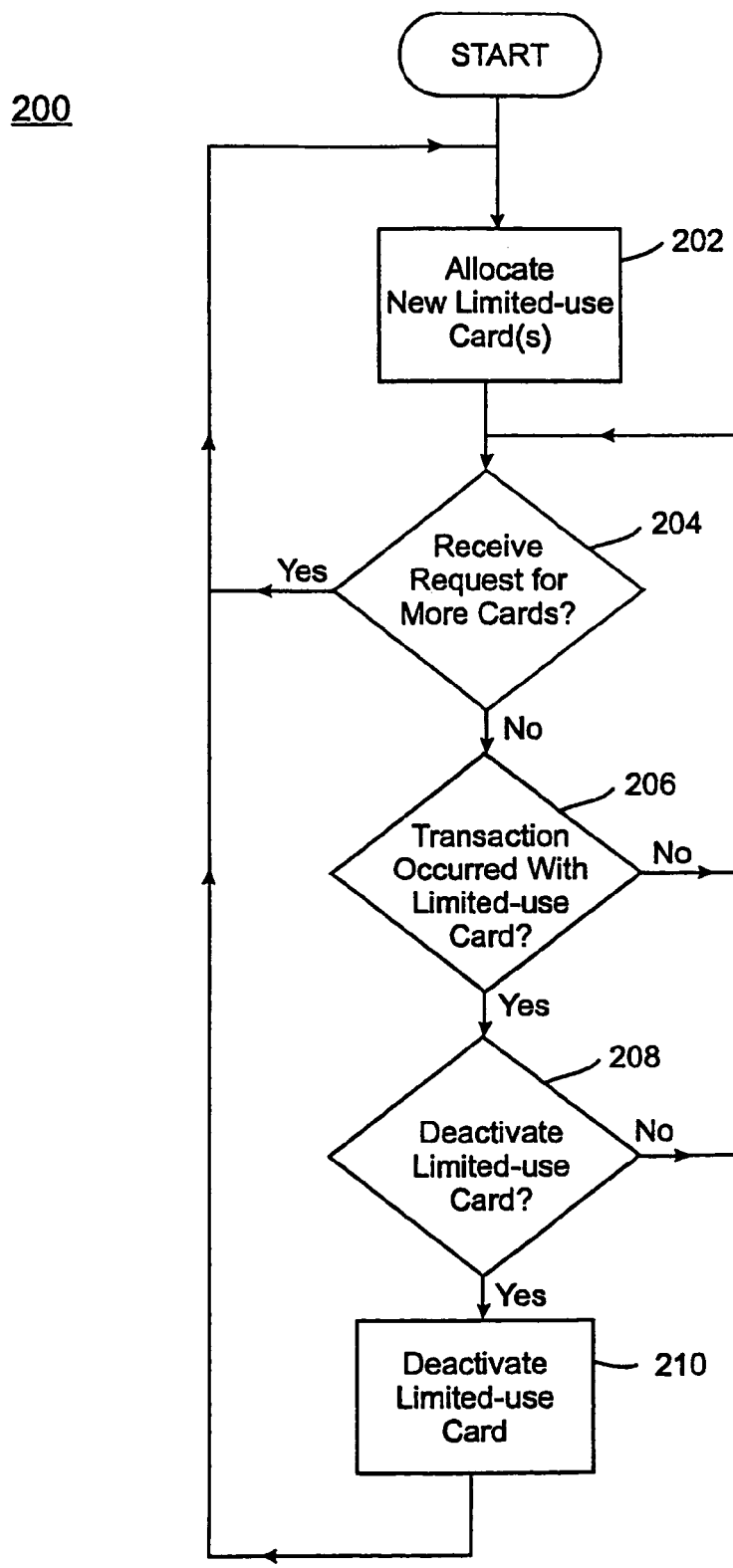
FIG. 2 shows, in high-level form, the operation of the central processing station shown in FIG. 1.

FIG. 2 shows a high-level depiction of the functions performed by the central processing station 102 or the like. The process begins in step 202 by allocating one or more limited use numbers to a customer. These numbers are ultimately selected from the list 126 of available limited use numbers, or some other sub-set list which has been previously formed from the numbers in list 126. Also, although not shown in FIG. 2, a master account number would have been preferably assigned to the customer at a previous point in time. The conditions database 122 may comprise a mechanism for associating the master account number (which can be a credit card number or some other type of account) number with the limited use credit card number. Because the limited use cards are arbitrarily chosen from the listing 126 of limited use card numbers, there should be no discernable link which would allow anyone to determine the master credit card number from any of the limited use numbers.

The processing then advances to step 204, where it is determined whether a customer requests or an event triggers a request for additional limited use cards or card numbers. If so, additional limited use cards or card numbers are allocated to the customer.

Processing then advances to step 206, where the central processing station determines whether a transaction has taken place using a previously issued limited use card. This step is followed by a determination (in step 208) whether the limited use number should be deactivated. For instance, if the card is a single-use card, it will be deactivated. If the card is a fixed-limit card, the card is only deactivated if the recent transaction exceeds some stored threshold limit. These threshold limits can be stored on the card itself or in the conditions database 122. The actual step of deactivating is performed by generating a deactivation command, as represented in step 210 shown in FIG. 2. Naturally, there are other steps to processing a credit card transaction, such as checking whether the card is deactivated or otherwise invalid prior to completing the transaction. These additional steps are system specific and are not discussed here for sake of brevity.

Once a number is deactivated, this number can not be fraudulently reused. Hence, the risk of fraudulent capture of these numbers over the Internet (or via other transmission means) effectively disappears. In an alternative embodiment of the invention, these deactivated numbers can be reactivated providing that a sufficiently long time since their first activation has transpired. Providing that there is a sufficiently large number of limited use credit card numbers to choose from, it would be possible to wait a long time before it was necessary to repeat any numbers. At this point, it would be very unlikely that someone who had wrongfully intercepted a credit card number years ago would be motivated to fraudulently use it before the rightful owner.

After the limited use card is deactivated or a number of limited use cards are deactivated, an additional limited use card or cards can be activated. As described in detail in the following section, the actual activation of the credit card number can involve various intermediate processing steps. For instance, the credit card numbers from the list 126 can be first allocated to an "allocated" range of numbers, and then to an "issued but not valid" range of numbers, and then finally to an "issued and valid" range of numbers. FIG. 2 is a high-level depiction of the process, and encompasses this specific embodiment, as well as the more basic case where the credit card numbers are retrieved from a database and then immediately activated.

Having set forth a summary of how the invention can be implemented, further details are provided in the following.

2.2 Allocation of the Credit Card Numbers

The first thing that the credit card provider should do is to generate a list of additional credit card numbers, whether they be single use or multiple use, and allocate additional credit numbers to a master credit card as a further credit card number for optional use instead of the master credit card number. Such a list can be produced by any suitable software package in the exemplary manner discussed in more detail below. Since the numbers allocated to a particular master credit card holder will not have any link to the master credit card number, the master credit card number should not be able to be derived from the additional credit card numbers.

In effect, randomness in credit card numbers is provided by the fact that there is a queue formed by the customers requiring numbers. Further, it should not be possible, even knowing the additional credit card numbers in a particular master credit card holder's possession which he or she may have used, to predict the next set of numbers that that particular master credit card holder will be allocated, since there will be randomness of access to additional credit card numbers in the truest sense. Even if the credit card provider were to allocate numbers sequentially, there would be no way of predicting the number that that credit card holder would subsequently acquire, since the numbers would be allocated by virtue of a queue, the randomness of this allocation being such as to prevent any prediction.

As such, the credit card numbers generated by the central computer need not be per se random numbers. Preferably, though, these numbers are valid credit card numbers with the constraint that they must conform to industry specifications of the format in terms of their numerical content in such a way that they can be handled with no (or minimal) modifications by merchant/acquiring systems and networks and be routed to the appropriate center for processing. An additional constraint is that they must be different from all other conventional account numbers and all other single use numbers during their lifetime of validity. These constraints are practical requirements to produce a commercially viable system, which would likely not be satisfied by any process that generates random numbers in isolation.

To achieve these allocation requirements, an issuing bank decides within its total available range of credit cards to allocate a certain range or ranges of numbers to the single use system, referred to herein as the "available range." This may represent spare numbers using existing header sequences (e.g., the sequence of usually 4-6 digits that define the issuing institution and are used to route the card to the appropriate transaction processor) or within newly created header sequences. The numbers not allocated include existing credit card accounts for that issuer and sufficient spare capacity for new account holders and replacement numbers for existing customers. The additional non-embossed components of the card details and any card specific information that is transmitted during a transaction may be varied from card to card to enhance security and privacy of credit card transactions.

Although each limited use number is unique during the its lifetime of validity, information required to route the card number and transaction details to the appropriate processor is maintained to ensure that limited use numbers are processed appropriately. However, the limited use numbers do not need to include either the master card account number or an encoded version of the account number. Indeed privacy and security are enhanced when no unique account holder identifier is included within the limited use credit card number.

Also, information that is verified prior to the card being processed for authorization and payment, such as expiry date and checksum digit must be valid. This information may vary from limited use number to limited use number, but must be valid to ensure that the number passes checks that may be completed within the merchant terminal, i.e., the checksum is appropriately calculated for each limited use number and the associated expiry date is valid at the time of use.

Within the constraint of using a valid credit card format, the random allocation process used to generate lists of unique limited use numbers can involve allocation from a range of numbers in which either the entire number or portions of the account number are varied. In addition, the allocation can include combinations of all or part of the account number together with all or part of additional information such as non-embossed additional numbers, expiry date and other information that identifies the card and is passed on by the merchant to the card processor during a transaction.

Sequential random allocation from a list of available valid credit/debit/charge card codes that have been solely allocated for use as limited use numbers ensures that the criteria specified for limited use numbers are met, i.e., no two limited use numbers are the same, no limited use number is the same as an existing account number, and no newly issued conventional card number is the same as a previously issued limited use number. To achieve true computational independence between account numbers and limited use cards and between limited use numbers for the same account, the random allocation process requires a truly random seed value. Such true randomness can be obtained from a physically random system with well defined properties such as a white noise generator. An analog to digital converter that receives an analog signal from such a truly random physical system can be used to ensure truly random allocation.

Other approaches can result in the same result with lower computational efficiency. For example the allocation process could randomly select valid credit card numbers within the entire range for a given card issuer and then discard the number if it is already in use as a limited use or conventional card number or if the same number was allocated within a given time frame.

The above process generates a series of available single use numbers. To repeat, the allocation process is achieved by a truly random (or less ideally a pseudo random) mapping process in which a single use number is randomly selected and then assigned to a selected account holder (either an existing credit/debit card holder, a new solely single use account holder or a bank account). Additional single use numbers can be allocated for purchase on an individual basis. Each assigned single use number is then removed from the sequence of available numbers before the next allocation, ensuring a unique allocation of each single use number. An alternative mechanism for performing direct allocation to a specific account holder is for lists of single use numbers to be allocated to unique storage locations. The list from a specific storage location can then be directly allocated to a given account at a later date. This allows for rapid allocation of cards to new customers without any delay arising from the need to perform a new allocation procedure for each new customer.

This allocation process generates another series of single use numbers, the "allocated range" with an associated identification field to determine how the account will be settled once used, i.e., onto whose account the transaction will be charged. The allocation process can occur a significant time before the single use numbers are required. Once allocated, they are not added into the list of valid accounts until required by the user.

Figure 3:
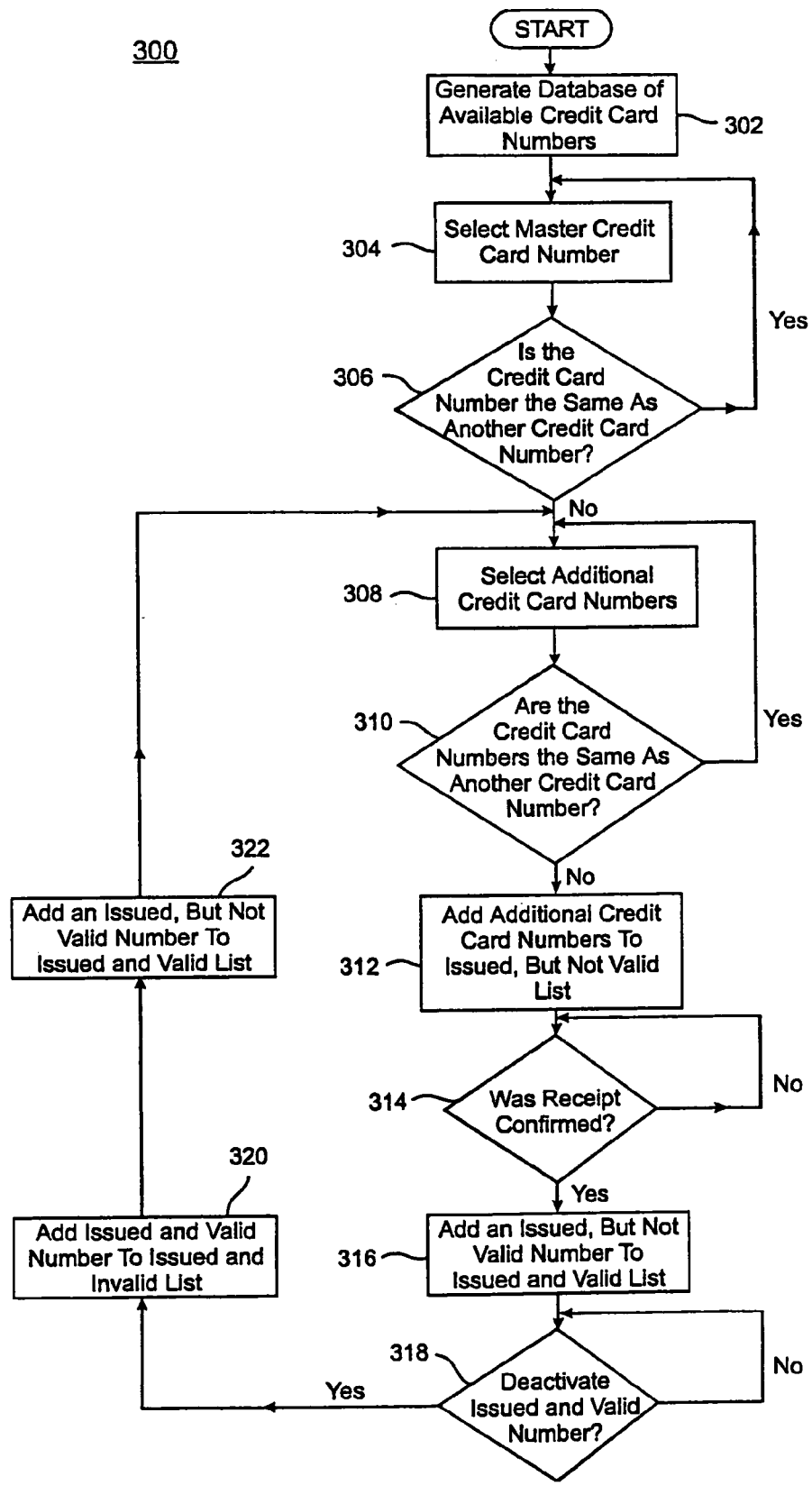
FIG. 3 is a flow chart illustrating an exemplary process for allocating credit card numbers.

FIG. 3 is a flow chart illustrating an exemplary process for allocating credit card numbers. A central processing unit (CPU) generates a database of credit card numbers (step 302), and may select a master credit card number. (Step 304). In step 306, the CPU checks to make sure that the master credit card number is not the same as another credit card number. The CPU selects additional credit card numbers to allocate to the master credit card number or other type of account number. (Step 308). The CPU can use any of the techniques discussed above to select the additional numbers. In step 310, the CPU checks to make sure that the additional numbers are not the same as another credit card number. The additional numbers can be used, for example, for single use cards.

When a customer needs single use cards, the CPU can issue the additional credit card numbers to the customer. Unless these single use numbers are issued directly into the hands of the customer (e.g., by an automated teller machine (ATM)), they are not directly added to the list of valid account numbers held within the central computer system. These numbers are added to an "issued, but not valid" list of numbers. (Step 312). The number of single use numbers issued at one time depends upon the rate at which the customer will use the cards and the capability of the device used to store the single use numbers until used. The CPU can provide the customer with enough single use numbers to fulfill their single use purchase requirements for up to, for example, 2 years. Each single use number can be endowed with specific restrictions in terms of transaction type or value, provided that these properties do not exceed the restrictions placed up on the customer's account (such as the available credit balance).

Once a series of single use numbers are issued, the user has the option of confirming receipt by telephone before any of the issued numbers become validated on the processing system. (Step 314). Once receipt has been confirmed (or assumed), not every issued single use number is added to the "issued and valid" list. (Step 316). To prevent excessive valid single use numbers being held within the processing system, the number of single use numbers declared to be valid at any one time is limited to account for waste of numbers (i.e., numbers that are accessed by a customer but are never used to complete a transaction) and to allow for time delays between different transactions leading to differences in the sequence in which single use numbers are accessed by the customer and the sequence in which they arrive at the processing center. The maximum number of single use numbers valid at any one time can be determined by the card issuer but would be preferably in the range of 5-10. In the case of any attempted use outside the allocated range, the next single use number can be used as an additional identifier to validate the transaction. In this case, only a subset of the digits should be given by the user to prevent a fraudulent trader being able to gain access to multiple unused single use numbers. As soon as a single use number is invalidated (step 320) on use (step 318), an additional number from the "issued not valid" list for that customer is allocated to the "issued and valid" list, ensuring a continual supply of single use numbers up to the maximum allowed until the next set of single use numbers are issued. (Step 322).

In relation to the actual supply of the additional credit card numbers, this will not cause any difficulties to the credit card provider. For example, with a standard master credit card number, there are up to fifteen or more digits, the first of which is used to identify the credit card provider, e.g., American Express®, VISA®, Mastercard®, etc. For major banks, three digits are used to identify the issuing bank. The last digit in a typical sixteen digit master credit card number is a checksum used to confirm that the number is a valid number. This leaves a total of up to 11 digits or more for the account identifying number and the expiration date. In some instances, the expiration date may not be sent back for clearance, while with certain credit card providers, additional credit card numbers or even additional information is required for clearance. For example, certain credit card providers print additional numbers on the card, which additional numbers are not embossed on the card and do not form part of the master credit card number. These additional printed and non-embossed credit card numbers can be used to identify that the person proffering the card for a non-card present transaction is actually in possession of the card when the order is made whether it be in writing or by phone. There are many devices, digits, pieces of information, etc. used by a credit card issuer or processor working for a credit card issuer to clear the credit card for the specific transaction. According to another embodiment, when issuing additional credit card numbers in accordance with the present invention, such additional credit card numbers could include a code which would identify that the person using the additional credit card number in a remote transaction is the one to whom the numbers were sent or, in the case of a disposable credit card, is the one to whom the disposable credit card was sent.

A preferred feature of these additional credit card numbers is that they be constrained to be in the correct format for a credit card number with a valid check sum, while at the same time be mathematically unrelated to each other or to the mas-ter credit card. In certain situations, for single use numbers, the expiration date is virtually irrelevant. Thus, using the month code of the expiration date with said eleven digits, there are $12 \times 10^{11}$, i.e., $1.2 \times 10^{12}$, i.e., 1,200 billion possible unique codes available for any given credit card provider. This would allow for 50 transactions a month for 10 years for 200 million account holders, before any codes would have to be recycled or a new header code introduced. When it is understood that there are then another $10^4$ header numbers that a credit card provider can use, it will be appreciated that the structure and arrangement of existing master credit card numbers is sufficient to operate this invention with the advantage that the existing infrastructure of dealing with credit card transactions can be used with minimum modification. All that is required for the credit card provider is to store the generated numbers against the master credit card number or other type of account number.

If, for example, the card is a VISA® card, there are approximately 21,000 issuing banks. The sixteen digit number has a "4" followed by a five digit code to identify the card issuer. The last number is a checksum to verify that it is a valid number. As a result, there are $21,000 \times 10^9 \times 12$ (252 trillion) unique numbers and associated expiry months. This number of codes is sufficient for 36,000 years of transaction processing at the current annual rate of approximately 7 billion transactions per year.

While existing credit card formats allow for a sufficiently large number of available card numbers, numbers will eventually need to be recycled for allocation. As the range of available numbers reduces in size over time, additional or recycled numbers should be added back into this range to ensure that the allocation process is performed from a range sufficiently large to maintain random allocation. The length of time prior to recycling depends on the total number of available unique card codes available to an issuer and the number of transactions that use limited use numbers. Such recycling can only occur after a number has been invalidated for further use and is no longer valid for refunds. Once recycled, automatic fraud detection mechanisms that would normally be activated on the attempted reuse of a previously inactivated card need to be altered by removing the recycled number from the list of previously issued limited use numbers.

2.3 Limitations on the Use of the Credit Card Numbers

The use triggered condition subsequent limitations placed on limited use card numbers, i.e., transaction value limitations, number of transactions limits, etc., are central to their additional flexibility and security compared to conventional credit/debit/charge cards. These limitations can be imposed and controlled in a variety of ways. For example, the limitations can be stored within a database held by the card issuer and used to check that the transaction falls within these limitations during the authorization process.

Figure 4:
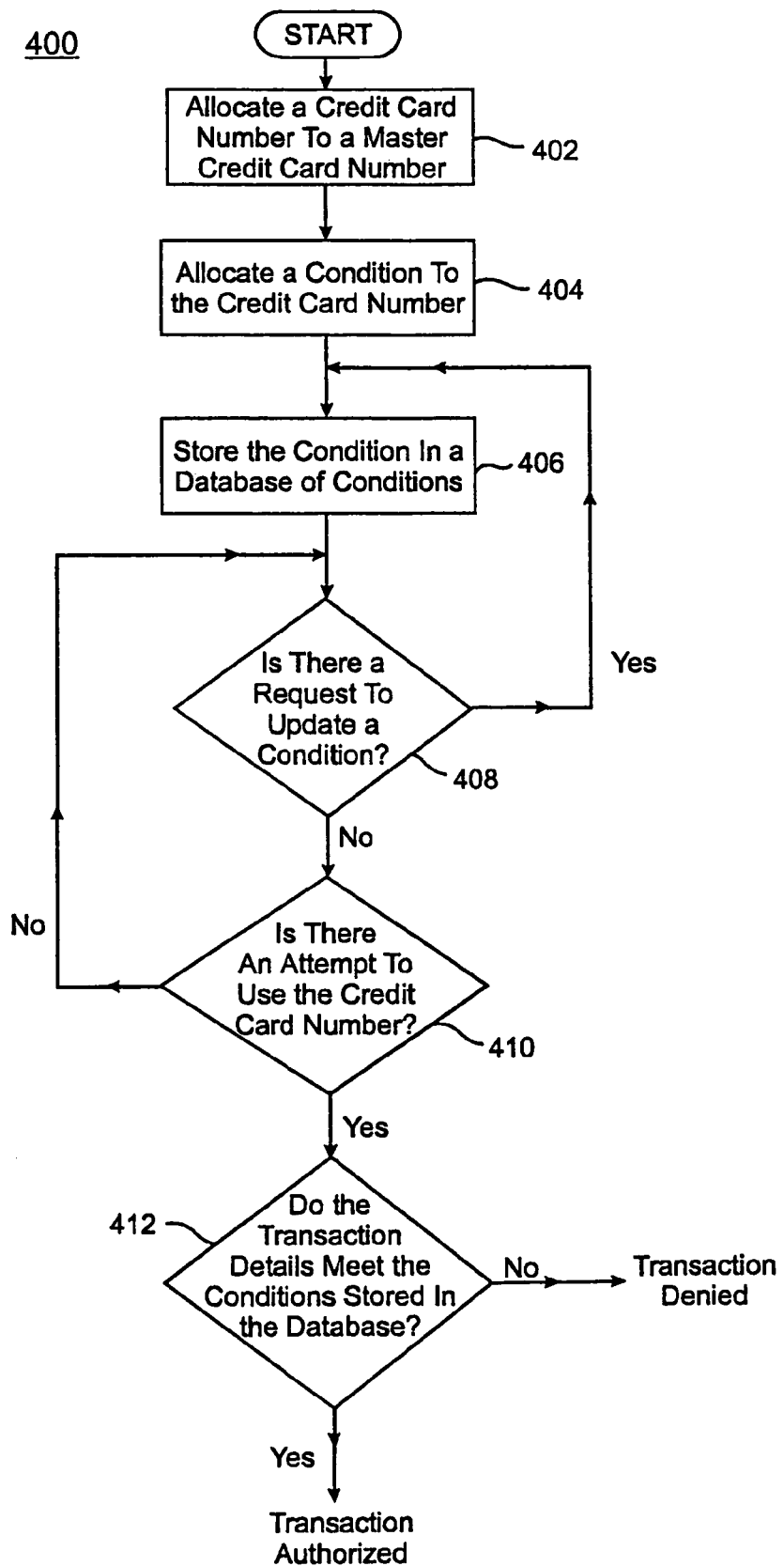
FIG. 4 is a flow chart illustrating an exemplary process for limiting the use of a credit card number.

FIG. 4 is a flow chart illustrating an exemplary process for limiting the use of a credit card number. A CPU can allocate a credit card number to a master credit card number (step 402), and allocate a condition to the credit card number. (Step 404). The CPU can then store the condition in a database of conditions. (Step 406). These limitations can be assigned by the issuer in a predetermined manner or can be imposed according to the requests of the card holder. These limitations can be encoded with the limited use numbers when the numbers are issued to a user so that the user can determine the limitations associated with a particular card. These limitations can be altered once a number is issued by updating the issuer database and the user maintained list of numbers. Communication between the user and card issuer to make these changes can be posted, conveyed verbally or electronically. (Step 408). When the card is used for a transaction (step 410), the transaction details are compared by the processing software with the limitations and the transaction is authorized only if the transaction falls within these limitations. (Step 412).

Alternatively, the limitations can be encoded within part of the number format that is transmitted during a transaction. The limitations would then be decoded from the transmitted transaction details by the card processor. This would offer the user more control, but would offer less security since knowledge of the encoding format could be used to fraudulently alter the limitations chosen by altering the appropriate portion of the limited use number format.

As Internet commerce develops, there will be an increased need for a wide range of financial transactions. The limitations placed on limited use card numbers can be used to implement a wide range of payment options. For example, a credit card number can be limited to a single transaction for a pre-arranged transaction limit. Or alternatively, a credit card number can be used, for example, to implement an installment plan where the credit card number is, for example, only valid for twelve payments for a pre-arranged transaction limit for twelve months to a single merchant. This plan provides security against fraud because it is locked to a single merchant, and it is only good for one year. Or similarly, a credit card number can be used to implement a debit plan where the credit card number is limited to a specific merchant.

When the limited use number is limited to a specific merchant, the merchant can be prearranged by the user or can be determined by first use. In this situation a limited use card can be used to generate an account specific to a single merchant. For example, this can be used in situations on the Internet where a web merchant will retain a credit card number for later purchases. By being limited to a single merchant, theft of the number from the merchant's computer systems will not allow the card to be used elsewhere. Also, any such use will immediately identify a specific merchant as having suffered a security breach. Determination-by-first use could involve linking the merchant name or credit card system identification number at the time of making the purchase, during the authorization process or during the settlement process.

Or finally, a credit card number can be used as a gift voucher where the credit card number is limited to a specific transaction value or limit, but it can be used for any merchant. A gift voucher limited use card could also have a pre-determined limitation to a specific merchant or a type of merchants or to a group of merchants such as within an "online shopping mall".

2.4 Distribution of the Credit Card Numbers

The next matter that is considered is how these additional credit card numbers and/or additional credit cards are distributed to a credit card holder. One way of providing such additional credit card numbers and/or additional credit cards is to in some way provide them physically to the master credit card holder, whether it be by collection, delivery by courier, post or some other way which can generally be covered under the heading of provision by post. Obviously, the financial institutions wish to provide the additional credit card numbers or the additional credit cards to the user as efficiently as possible with the minimum risk of the additional credit card numbers and/or cards falling into a third party's hand. While one can never prevent theft, for example, of a credit card from a user, what is important is to ensure that these disposable credit cards and/or credit card numbers are delivered to the user with the least possibility of a third party obtaining either the numbers or the disposable credit cards from the time they are generated until the time they are physically received by the user.

It is envisaged that there are various methods by which a credit card provider could issue the additional credit card numbers and/or credit cards to the user. One of the simplest ways would be to post them on request. Another way would be for the credit card provider, after receiving a payment of an account or with a statement of an account, to provide a sufficient number of additional credit card numbers and/or additional credit cards to replace the ones used since the previous statement. Particularly, if such statements do not quote the master credit card number or some code number, it would be possible to put in additional checks on the activation of the additional credit card numbers or credit cards. Some form of receipt system could be used. In this way effective theft would be reduced.

Figure 5:
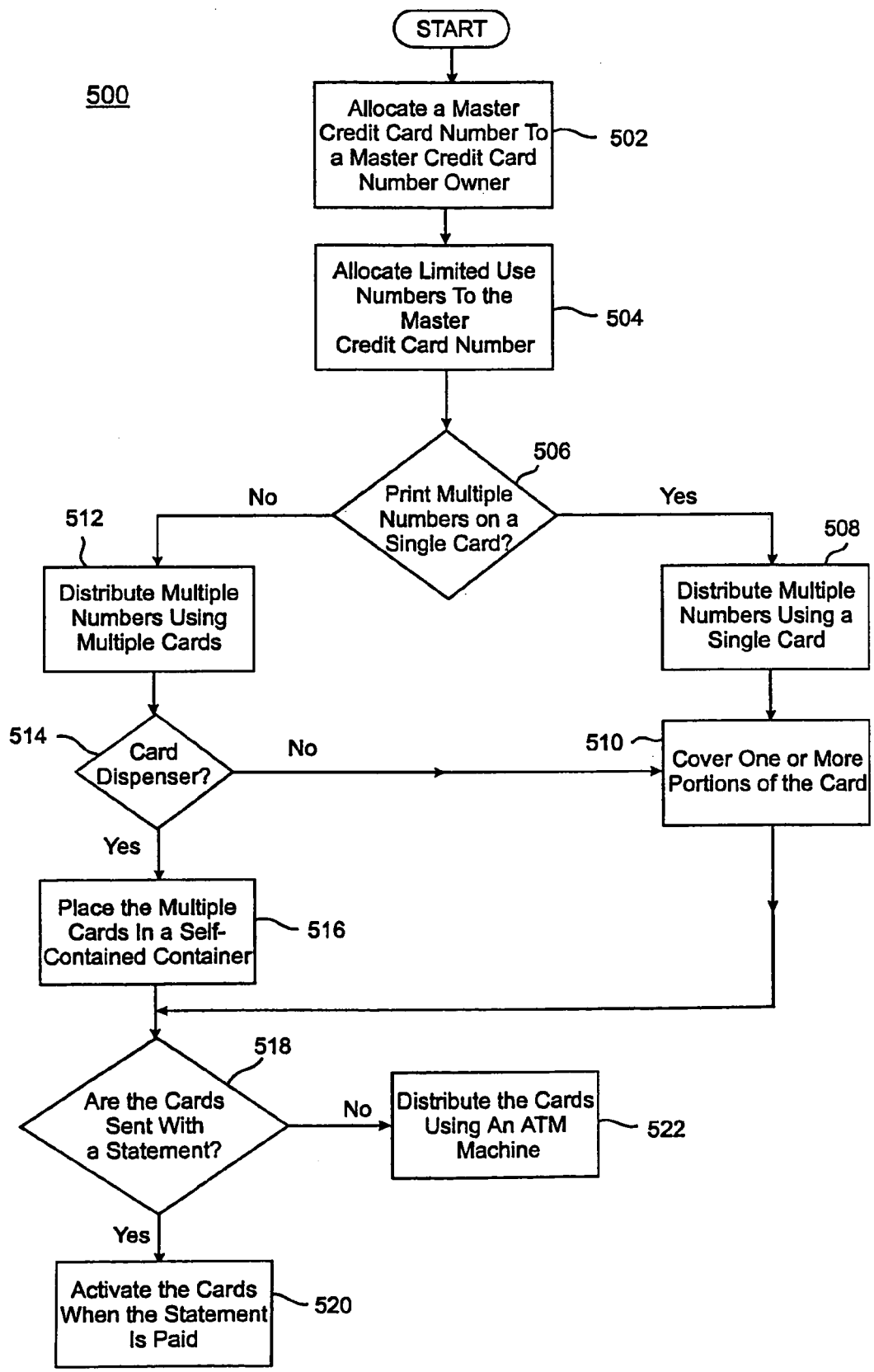
FIG. 5 is a flow chart illustrating an exemplary process for distributing credit card numbers.

FIG. 5 is a flowchart illustrating an exemplary process for distributing credit card numbers. A credit card issuer allocates a master credit card number or more generically a type of master account number to a master credit card or account owner. (Step 502). The credit card issuer then allocates limited use numbers to the master account number. (Step 504). For pre-prepared cards, the card issuer can decide whether to print (or incorporate by some other means such as embossing) one number per card or multiple numbers per card. (Step 506). The card issuer can distribute multiple numbers using a single card (step 508) or distribute multiple numbers using multiple cards. (Step 512).

In either case, it is important that the user can keep track of which numbers have been used. If the card has only one number, an opaque removable cover can be used to cover one or more portions of the card. (Step 510). For example, the opaque removable cover can cover the number portion of the card, so that the cover has to be removed before the card can be used. The act of removing the cover indicates that the card number has been accessed or used.

Or alternatively, an opaque removable cover can conceal a message such as "used." The opaque removable cover can be a scratch off layer that is scratched off before or after the card is used. The scratch off layer can resemble the layer that is often used to cover lottery numbers or the like. Or alternatively, the single use cards can be placed in a self-contained container that resembles a razor blade dispenser. (Step 516). The owner can remove a single use card from a first compartment and then place the used card into a second compartment.

If the card has multiple numbers, the owner can keep track of the numbers by using a device that covers one or more portions of the card. (Step 510). The device can cover the numbers until they are used. As described above, the device can comprise multiple opaque layers that must be removed prior to the use of each number. Or alternatively, each number could be visible when the card is issued and each number is associated with a panel in which an opaque covering conceals a message that indicates that the number has been used. After each use, the corresponding covering is removed or scratched off to indicate that the number has been used.

In both above cases the solutions incorporated on the cards act to remind the user which numbers have been used. The critical check on the validity of the number is performed by the processing software responsible for authorizing card transactions.

The additional credit card numbers and/or cards can be sent with a statement. (Step 518). The additional credit card numbers are not activated until the statement is paid. (Step 520). The card issuer could also require that the payment be accompanied by the master credit card number or another identifier. Or, for example, an additional security step involving either direct contact with the issuing credit card company or an independently issued password to allow activation of an electronic device could be used.

A further way in which the additional credit card numbers and/or additional credit cards could be distributed to the user is by way of an ATM machine. (Step 522). The ATM machine with very little modification could provide the additional credit card numbers. Similarly, with relatively little modification, an ATM machine could provide additional credit cards.

Cards/single use numbers can be issued directly into an electronic device that is capable of storing such numbers. This applies to mobile phones and pager devices to which information can be transmitted using existing systems and computers connected either directly or via a telecommunications system to the Internet or a specific host computer system. In such a situation a mechanism is required to protect these numbers in transit to prevent unauthorized access. For global applications, this mechanism must not be subject to export restrictions. In addition, this protection should not be susceptible to "brute force" decryption techniques. Such a system is described below in relation to the storage of single use cards.

An alternative method to provide additional credit card numbers could be by way of a computer programs. Obviously it would be necessary for the credit card provider to have sufficient security that when the computer program was dispatched, either through the telecommunications network or through the post, that unauthorized access could not be obtained.

2.5 Electronic Use of the Credit Card Numbers

In the situation where the user stores and accesses limited use numbers via an electronic device such a computer of any form (desktop, television or cable linked Internet access device, laptop, palmtop, personal organizer, etc), any device that can deliver the same functions as a computer or dedicated Internet access device, a dedicated microprocessor device with key pad and screen or any form of telephone with associated microprocessor controlled electronics, the associated software can perform some or all of the following functions:

1) Password controlled access to software or other security activation system that can verify that the user has a valid right of access.

2) Secure storage of issued limited use credit/debit/charge card numbers until required by the user. These numbers can be stored in a variety of encrypted forms. An additional security step is to encrypt the number in the form a valid credit card number as previously described.

3) Secure storage of transaction details and date of use for reconciliation with records held by the credit/debit/charge card company in case of disagreement. This may include digitally signing each transaction record.

4) Facility for user to review past usage of limited use card numbers and transactions.

5) Notification to user of available number of limited use cards.

6) Initiate automated request from software to card issuing organization or agreed agent for further cards to be issued by previously agreed route if requested by user or if the number of available limited use cards is less than a pre-arranged limit.

7) Secure communication between software package and card issuing organization or agreed agent for downloading additional limited use numbers. This secure communication can exploit any available form of encryption suitable for this purpose.

8) Secure communication between card issuing organization or agreed agent and the software package for the transmission of information regarding credit card transactions, account balances and other information as requested by the user or card issuer. This secure communication can exploit any available form of encryption suitable for this purpose.

9) Automated or manual means for transfer of credit card information to the merchant. The software can integrate with Internet software in the situation where it is run on a device linked to the Internet or similar electronic network and allow automatic transmission of transaction details if the merchant software so allows. To ensure compatibility with any form of merchant software the user also has the option of dragging and dropping a limited use number displayed by the software onto the appropriate part of a web page, or manually entering the number. In the case a device intended for use over the telephone, the number can either be spoken by the user or appropriate tones can be generated to automatically transmit the number to the merchant.

10) Use of digital signature verification to verify both parties of a credit card transaction (i.e. merchant and cardholder).

11) Use of digital signature verification to verify both parties of a communication involving the transmission of financial information or additional limited use card numbers (i.e. card issuer and cardholder).

12) Use of stored lists of limited use numbers held by user and card issuer as dynamic passwords to verify both parties (user and card issuer) of a communication involving transmission of financial information or additional limited card numbers.

For "card not present" transactions, it is proposed that the customer uses an electronic device to store issued single use numbers. This may represent a range of devices from a mobile telephone, pager, dedicated single use storage device or a software package that can run on range of platforms such as a conventional desktop computer, television based Internet access device (e.g., WebTV) or a portable computing device.

The software that is used within these devices for storing and accessing these numbers will have specific features that are common to all platforms/devices.

For security reasons, access to the software will be password protected or protected by another security system that allows identification of the user (e.g., magnetic stripe card reader, chip card reader, electronic token generator, fingerprint recognition system or the like). Multiple passwords may be employed to provide limited access to certain individuals, for example limiting access for a family member to single use numbers with specific pre-allocated limits on application or maximum transaction value.

The single use numbers are preferably stored in a secure form involving one or more encryption systems. It is proposed that a dual system will be employed using a standard protocol (e.g, DES or RSA encryption) and a specific system designed for credit cards as described below.

"Brute force" decryption involves using multiple fast computers and specific algorithms to test large numbers of possible encryption "keys." Success can be determined by seeing whether the result appears in the expected format, for example as comprehensible English text in the case of an encrypted document. If the encrypted version is in an identical format to the unencrypted version (though with different information) then brute force decryption cannot succeed. This is not a computationally viable option for text but it is possible for credit cards.

The approach is to break down each component of a credit card number and encrypt these with a private password so as to maintain the numerical composition of each component. The end result should be securely encrypted but should not represent another existing credit card account. This can be achieved by constraining the encryption system to convert the credit card header sequence used to identify the issuing bank (usually 4-6 digits) into a currently unused sequence. Since this information will be constant for all cards from the same issuer, this information should be randomized (rather than encrypted) to prevent recognition of a valid decryption solution. Once the rest of the number is decrypted by the program, the appropriate header sequence can be added. The remaining digits excluding the checksum (the last digit) are then encrypted using any private key encryption system that will maintain the same number of digits and produce a result that represents the numerals 0 to 9. The expiration date and any other identifying digits are also encrypted in such a manner as to respect their existing structure, i.e., the month is encrypted between 1 and 12 and the year is encrypted so as to represent a number within the next three years that ensures that the expiration date is valid. Following these steps, the digits used to calculate the checksum in a normal card number are processed to calculate a valid checksum for the encrypted card. The result is a valid appearing credit card number that has a 110 valid checksum and which can be guaranteed not to belong to any existing credit/debit card account holder.

For example, for a card with a 6 digit header and valid checksum, e.g., "1234 5678 9012 3452 expiration date of 12/99," 123456 is randomly assigned to a currently unused header sequence, e.g., 090234 (this is an example and does not necessarily represent an unused header sequence). 789012345 is encrypted into another 9 digit number, e.g., 209476391. 12/99 is encrypted to a valid date format that ensures the card is not expired, e.g., 3/00. The checksum is recalculated to produce a valid appearing credit card number, for this example the checksum is 4, i.e., 0902 3420 9476 3914 expiry 3/00.

To decrypt this number for use or after transmission from the bank, the appropriate header sequence for the issuer is exchanged for the digits in the encrypted number. The other digits are decrypted using the private password and the checksum is recalculated.

Provided that the header number is unused and the private password remains private, then this number is encrypted in such a way that brute force encryption cannot be used to determine the original number, since it will not be possible to determine when the correct solution has been reached. In combination with standard encryption systems, this allows a means to securely store credit cards and transmit them over insecure systems with confidence.

Once the appropriate password is entered into the software, the next available single use number is decrypted and either displayed, allowing the customer to use it in any form of trade that can achieved by quoting credit card information, or directly transmitted via the software to the merchant. Once used, the single use number is removed from the stored list. The date of access, the number accessed and any additional available transaction details are then stored in a secure fashion and digitally signed to allow for verification in the case of a disputed transaction. Each access to a single use number requires the entry of a password to prevent unauthorized access if the customer leaves his software/computer device unattended and active.

Other types of encryption may also be used, for example, which require the use of a mask and/or private key. For example, as described above, this approach also breaks down and encrypts each component of a credit card number so as to maintain the numerical composition of each component. Similar to that described above, the bank identifying header sequence, e.g., in the case of VISA® cards, the initial digit "4" followed by the 5 digit BIN number, is replaced with an equal number of random digits taken from the range of unused headers. This ensures that the resulting number does not represent some other valid existing credit card number. These replacement header sequence digits can be fixed for a given card issuer and can be reconstructed after decryption.

The final checksum digit can be handled in one of several ways. For example, the checksum digit can be recalculated based on the encrypted remaining digits as described above. Alternatively, the final checksum digit can be omitted from the encryption process and recalculated after decryption.

The remaining digits can be reformatted into another number with the same number of digits by any reversible encryption process. The same process may also be applied to all other numerical information transmitted that may be issued during a transaction, e.g., the expiry date and other codes. One process for randomizing these remaining digits is described above. Another process to encode the remaining digits is to perform a digit by digit mathematical operation in combination with a mask containing the same number of digits as the remaining digits to be encoded.

For example, assume the original remaining digits are 878918982 and the random mask digits, containing the same number of digits as the remaining digits to be encoded, are 143337658. A modulo 10 arithmetic function is then performed using the original remaining digits and the random mask digits as follows to achieve the encrypted result.

| Original remaining digits | 8 | 7 | 8 | 9 | 1 | 8 | 9 | 8 | 2 |
| Random mask digits | 1 | 4 | 3 | 3 | 3 | 7 | 6 | 5 | 8 |
| Encrypted remaining digits | 9 | 1 | 1 | 2 | 4 | 5 | 5 | 3 | 0 |

After transmission of the encrypted card number, including the replacement header sequence digits, the encrypted remaining digits and the checksum digit, if appropriate, the encrypted card number is separated out into its components. The encrypted remaining digits are decrypted in the opposite manner in which they were encrypted. Specifically, knowing the random mask digits and the encrypted remaining digits, a modulo 10 subtraction is performed to reconstruct the original remaining digits as follows.

| Encrypted remaining digits | 9 | 1 | 1 | 2 | 4 | 5 | 5 | 3 | 0 |
| Random mask digits | 1 | 4 | 3 | 3 | 3 | 7 | 6 | 5 | 8 |
| Original remaining digits | 8 | 7 | 8 | 9 | 1 | 8 | 9 | 8 | 2 |

Even with this simple encryption technique, the decryption solution requires access to the private key because the solution cannot be identified in isolation. In addition, this process enables the reconstruction of one of the sequences, i.e., the original remaining digits, the random mask digits or the encrypted remaining digits, knowing the two other sequences.

Figure 6:
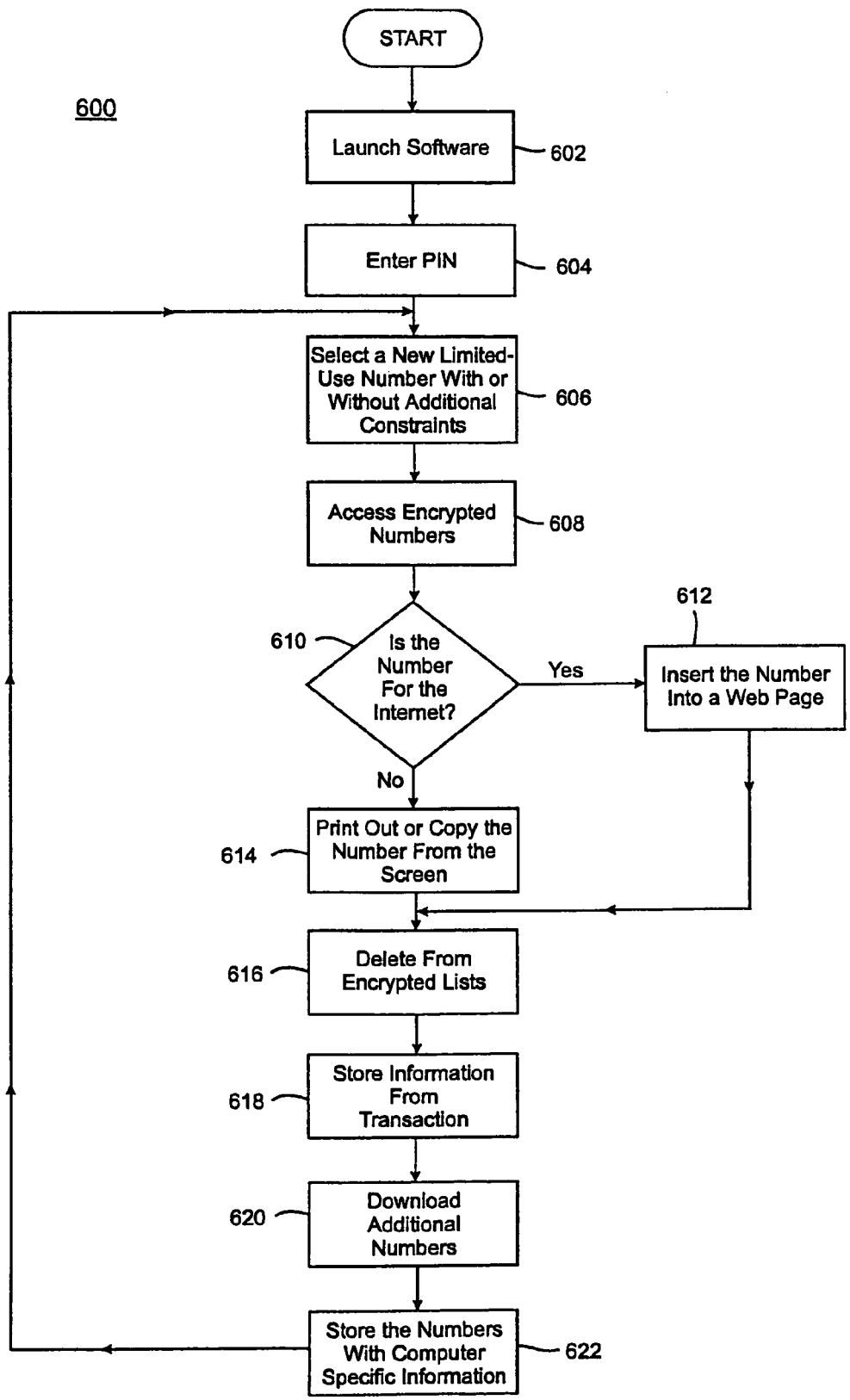
FIG. 6 is a flow chart illustrating an exemplary process for electronically using credit card numbers.

FIG. 6 is a flow chart illustrating an exemplary process for electronically using credit card numbers. The software can be launched either on its own or activated by an icon integrated into an Internet browser. (Step 602). The software can provide a simple interface with a graphical appearance that exploits familiar images of credit cards and/or ATM's. The software can be programmed using Java code or a Java core embedded in a c/c++ application or equivalent programming language.

Once launched the user puts in one password to gain access to the main screen which contains a key pad to allow a PIN to be inputted either by keyboard or by mouse clicks. (Step 604). The latter protects against any covert attempts to record passwords by trapping key strokes. A consecutive number of errors in inputting the password will permanently disable the program and overwrite remaining encrypted numbers. After the correct PIN is entered, the user can select a new limited use number with or without additional constraints (e.g. maximal transaction value). (Step 606). A new limited use number is then displayed on the graphical interface. The software can provide secure access to encrypted credit card numbers that are stored on a computer's hard disk. (Step 608). These numbers can be accessed for use on the Internet or for use over the phone/mail order. (Step 610). The numbers must therefore be able to be inserted directly into a web page (step 612), or printed out/copied from screen for use in other ways. (Step 614). The limited use number can be copied, printed, pasted via the clipboard (or equivalent) or dragged-and-dropped onto a web page. The length of time a number is displayed and how the program terminates are user configurable. The user can also record a comment to provide further information about how a number was to be applied. For automated transactions, the software should ideally be able to intercept and respond to merchant server initiated signals activating integrated functions within the browser.

Once a number has been accessed, it can be deleted from the encrypted lists. (Step 616). The date, number, current URL in the case of Web use and any user comments are then stored by a separate form of encryption to facilitate audit/review. (Step 618). The user can review, but not edit this information There should be a facility for downloading additional numbers either from additional floppies or via the Internet using high security protocols. (Step 620). The latter function can be performed by a separate program.

The program should include a maximal degree of transparent security features, i.e., features that do not affect a normal user, but that protect against the program being reinstalled or copied onto a second machine. This means that the encrypted limited use numbers should either be stored within the executable file or stored in a file that also stores encrypted copies of the machine specific information. (Step 622). This is required to ensure that the numbers can only be accessed on the machine on which the software was first installed. The data files should also be stored as hidden system files.

Some users may wish to have the equivalent of an electronic wallet that can be de-installed from one computer and reinserted on another, for example, when transferring a "wallet" from an office to a home machine. This transfer process ensures that only one version of the program is running at any one time and that no problems arise in terms of reconciling lists of used numbers. Appropriate security mechanisms can be implemented to identify the valid user.

Appropriate security measures include encryption. Encryption of limited use numbers should involve two levels as exemplified above. At the first level, the card numbers are encrypted using an algorithm that acts only to alter the free digits within the credit card. The header sequence (i.e., BIN number) is left unaltered or converted into an unused BIN number and the checksum recalculated. This prevents any form of brute decryption because there will be no way of telling when the correct algorithm has been selected since each number starts and ends up as a valid looking credit card number. Following this step each number is encrypted with industry standard encryption methods (e.g. RSA or DES). Following decryption within the program the checksum is recalculated for the final number and the appropriate bin number reinserted.

The software can be shipped on a single 1.4 Mb Floppy (or any other computer readable or usable medium) in an encrypted form or downloaded from a website. Limited use numbers can be issued either with the program or independently. An independently shipped password can be required for installation. The installation process will allow the program to be installed a restricted number of times after which critical data is overwritten. The precise number of allowable installations will be easily alterable within the software design. Once installed on the host computer, the program encrypts internal information regarding the machine's configuration to protect against copying of the program onto other machines. At first installation the user can select his own passwords. These will be used to control both access to the programs and to influence the pattern of one level of encryption that is applied to limited use numbers.

As numbers are accessed, a graphical indicator of the remaining amount of limited use numbers provides early warning if additional numbers are required. The software can also provide a log of previously accessed numbers, the date, associated URL if activated from within a browser and comment; a summary of account expenditure; assistance with adding additional numbers from disk or via Internet; the ability to configure additional passwords/users for shared cards; and/or hot link Internet access to the card number issuer's web site.

2.6 Processing of Card Transactions

It is envisioned that additional credit card numbers and/or additional credit cards would be processed by merchants in the same manner as existing credit card numbers and/or credit cards with the merchant obtaining validation of the credit card number from the credit card company or authorized third party. In much the same way as at present, the additional credit card number would be matched to the customer account and the account would be debited accordingly. The merchant reimbursement following verification of an additional credit card transaction would be performed in the normal manner. A particular advantage for the merchant is that since they are never in possession of the master credit card number or indeed, in many instances, of the master credit card, they have no responsibility for security to the master credit card holder. It is envisaged that where there are additional credit cards used, it may not be preferable to take an imprint of the credit card manually, as the imprint can be taken electronically. Similarly, those processing the credit cards will process them in the same manner described heretofore.

Processing systems for handling limited use cards perform a number of functions including some or all of the following:

1) Verify that the limited use number is valid.

2) Verify that the transaction falls within limitations placed on the specific number.

3) In the case of a limited use number associated with another account, verify that transaction falls within limits acceptable for the associated account.

4) Provide authorization to the merchant if valid and within the limitations for specified number and associated account.

5) Permit later transactions to be charged to a limited use number that has been invalidated for further authorizations only if the transaction is generated by the same merchant that obtained pre-authorization for the same transaction.

6) Deny authorization if invalid or exceeding limitations on number or associated account.

7) Activate fraud detection mechanisms if invalid number or on attempt to reuse an invalidated limited use number.

8) Invalidate limited use number for further authorizations/payments if limitations on use are met or exceeded by a specific transaction.

9) Maintain list of invalidated numbers for reimbursement in the case of returned or faulty goods for a defined period.

10) Limited use numbers and transaction details logged and linked to associated account.

11) Transmit records of limited use and other card transactions to the user by post or e-mail.

12) Instigate payment to merchant for approved transactions.

13) Instigate reimbursement to account holder in case of a refund.

14) Invoice account holder for payment for charges incurred or arrange settlement via another account.

Many of the procedures associated with limited use cards represent functions already performed by the clearing systems. These existing functions include: adding new credit/debit card numbers to the processing databases; allowing these card numbers to be activated following a confirmatory call to the issuer by the customer; conferring a credit limit on a credit card number; and invalidating a credit card number from further use and marking any further use as fraudulent. This overlap represents part of the commercial value of the single use invention, minimizing the required changes.

Once a limited use number enters the clearing system it can be handled in a normal fashion, e.g., by ensuring that it has not been reported as being stolen and that it represents a valid account number within the database. If the transaction is within the credit limit of the customer and the transaction limit or restricted use limitations of the limited use number, it is authorized.

Several specific modifications should be made to the processing software to implement the features of limited use cards. For instance, valid limited use numbers are stored in a database of valid account numbers along with other information specific to limited use numbers. This includes sufficient information to identify the customer to whom it was issued and any additional limitations placed upon the card in terms of transaction value or category of merchant for which the card can be used.

Once authorized, the limited use number is invalidated so as to ensure that further authorization/charges cannot be made on that number. To allow for authorization preceding request for settlement by a substantial delay, for example in the context of a mail order purchase where a credit/debit card number may be authorized at the time of order and charged only when the product ships, delayed settlement to the same merchant must be allowed.

Once the number of transactions permitted for a limited use card is reached, the central card processing software invalidates the card. Due to the time delay that can occur between authorization and a merchant request for settlement, improved security is achieved by linking the invalidation process to authorization. Linking invalidation to settlement facilitates pre-authorizations at the cost of increased risk of, for example, multiple use of a card number intended for limited use. Pre-authorizations can be used with authorization dependent invalidation as described above. In the case where a transaction is not authorized before being accepted by a merchant, the invalidation process will occur when the transaction details are transmitted to the processor for settlement. When no authorization is obtained for a limited use number the system will therefore still operate normally with an increased level of risk for the issuer/merchant as is the case with an unauthorized conventional card transaction.

Whenever the credit limit or validity of a customer's account changes, all currently valid limited use numbers are identified and their associated credit limit is altered to the lower of either their allocated transaction or the existing credit limit. If the customer account is closed or declared delinquent, all valid single use numbers are handled in the same manner.

Whenever a limited use number is used, the next available single use number previously allocated to the same customer and issued to the customer is added to the database of valid account numbers.

When a transaction is charged to a limited use number, the transaction details and customer account details are stored together for audit purposes and the value of the transaction is added to the customer's account for billing.

The software for storing transaction details and printing statements can be modified to allow for both the customer's conventional account details and the limited use number transaction details to be reported.

Processing of limited use numbers can be integrated into existing systems in a variety of ways. The authorization and settlement process can be completed in a single cycle or split into a separate authorization and settlement processes as is commonly done in existing credit card systems.

In the case of an entirely new, stand-alone, limited use credit/debit/charge card processing system, the above functions can be implemented without restriction in any suitable computer capable of incorporating the required database and communication functions. Such a system should be able to provide an authorization for a transaction within the same time scale as an existing credit/debit/charge card transaction.

In the case where the above functions have to be integrated into existing systems several approaches can be taken to minimize the required changes. It is possible to add steps to the processing chain that is encountered as soon as a credit/debit/charge card number is received from a merchant.

Figure 7:
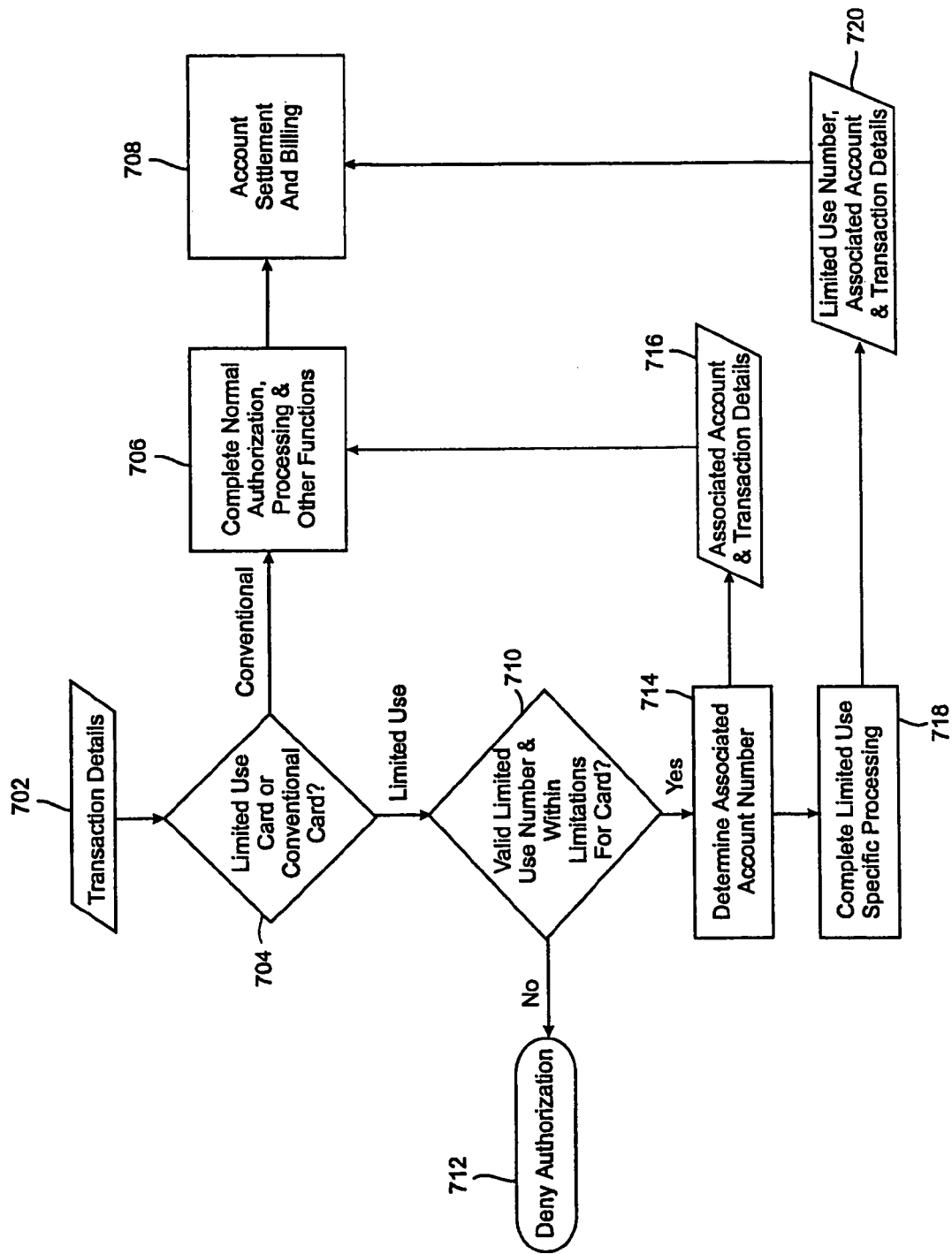
FIG. 7 is a flow chart illustrating an exemplary process for processing a transaction.

FIG. 7 is a flow chart illustrating an exemplary process for processing a transaction. In step 702, a software system receives transaction details from a merchant. The software system determines whether the number is a limited use number or a conventional card number. (Step 704). If the number is a conventional card number, it is passed on unchanged into the processing system and can be handled by existing systems with no modification. (Step 706). The merchant receives authorization from the system responsible for authorizing conventional card numbers. Merchant reimbursement is similarly unaffected. (Step 708).

The system can check the limited use number and the corresponding limitations. (Step 710). If the number is not valid for the designated transaction, the transaction is denied. (Step 712). Otherwise, a database look-up procedure determines the associated master account number and transmits this number (i.e. the master account number) back into the processing system. (Step 714). This allows all existing fraud detection, authorization and demographic software procedures to be completed with no alteration. (Step 716). Once the master account number is substituted for the limited use number a number of additional steps are required. (Step 718). If the criteria for invalidating the limited use number have been met during this transaction, then the limited use number is invalidated for all future transactions except refunds. An additional limited use number can be automatically issued if a continual supply of single use numbers is required. The transaction details and master account number are then transmitted for inclusion within a database to allow for tracking of transaction details and billing of the user. These functions do not need to be performed before an authorization is issued but can completed afterwards. (Step 720). However, performing such steps together with the validity verification of the limited use number prior to issuing an authorization message to a merchant is a feasible option with a minor reduction on the processing time required to issue an authorization message.

With the above system, the software responsible for substituting the master account number for the limited use number can also process additional features unique to limited use numbers. These features include transaction value limitations, merchant type restrictions and geographical limitations. If the transaction exceeds the limitations placed on the limited use card then authorization is denied and the master credit card need not be passed on for further processing. In the case of a transaction falling within the limitations of a limited use card, then the transaction details are passed on with the master account number for conventional validation. In this way the restrictions in place for the master account (e.g., available balance, expiry date) are checked for each limited use transaction.

Specific fraud detection mechanisms can also be incorporated into the software. For example, on the first occasion that an invalidated limited use number is used this transaction can be flagged as potentially fraudulent and appropriate measures taken. Repeated attempts to authorize invalid numbers from a single merchant or group of merchants also potentially points to fraud and can lead to activation of appropriate fraud management measures.

The above system requires the least modification of existing systems but may take up to twice the processing time of a conventional transaction due to the double authorization process, once within the limited use verification and translation step and once within the standard systems. It may be advantageous to initially process the limited use card as a master credit card by using a single list of limited use numbers and master credit card numbers.

Figure 8:
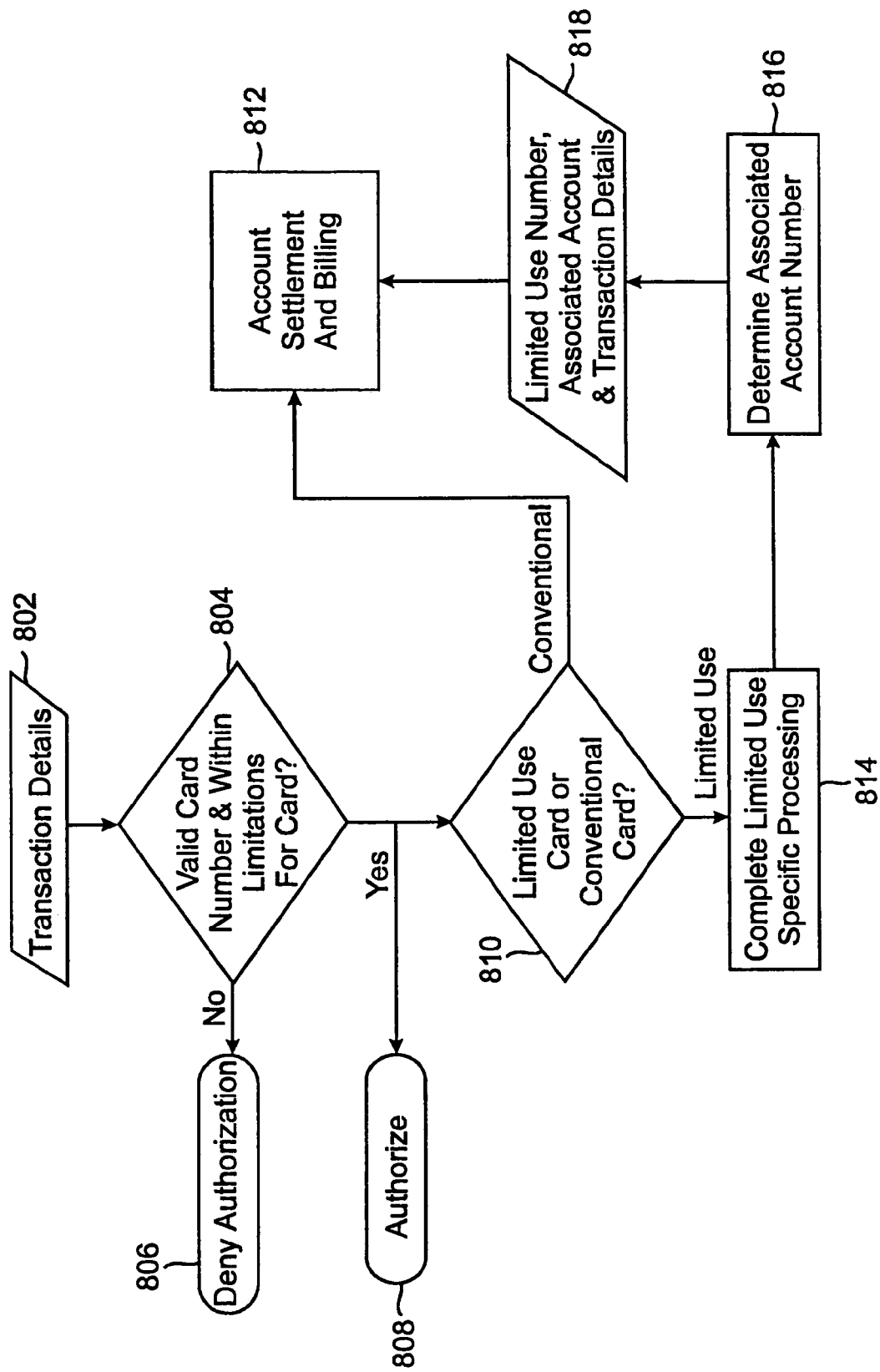
FIG. 8 is a flow chart illustrating another exemplary process for processing a transaction.

FIG. 8 is a flow chart illustrating another exemplary process for processing a transaction. In step 802, a software system receives transaction details from a merchant. The software system has access to a database that contains additional information to identify the associated account or means of settlement and specific limitations relating to the use of limited use cards. As a result, limited use numbers can be associated with existing accounts in the manner currently used to associate multiple conventional accounts in the case of multiple cards issued to a single company for corporate use. (Step 804). During an authorization the associated account number need not be identified provided each limited use account is updated whenever the status of the associated account changes (e.g. available balance, account validity etc.). The system can deny authorization (step 806) or authorize a transaction (step 808) without identifying the associated account number.

For settlement and billing purposes (step 812), the associated account needs to be identified (step 810), but this does not need to be done during the course of an authorization. The existing software should be modified or linked to a new program that performs duties specific for limited use card numbers as described above. (Steps 814, 816, and 818). These functions do not need to be performed before an authorization is issued. These functions can be completed afterwards.

This system requires more modification of the existing processing software systems, but offers authorization times within the same timescale as existing transactions since only one authorization steps is involved. Other activities such as updating the limitations on the limited use card when the master account changes can be performed outside the authorization process (i.e., "off-line").

Such other activities can also take place while the system is operating. The system may include some or all of the following features:

1) A system capable of altering the nature and value of limitations associated with a specific limited use credit/debit/charge card number on the basis of the usage of that specific limited use card number in transactions, where such alteration is conducted while the system is operational;

2) A system capable of altering the nature and value of limitations associated with a specific limited use credit/debit/charge card number on the basis of instructions generating on behalf of the issuing bank, where such alteration is conducted while the system is operational; and 3) A system capable of altering the nature and value of limitation associated with a specific limited use credit/debit/charge card number on the basis of instructions generated on behalf of the card holder, where such alteration is conducted while the system is operational.

The invention is not limited to the embodiments hereinbefore described but may be varied in both construction and detail. For instance, the invention has been heretofore described mainly in the context of a system in which a customer receiving a single use card already has a main account with the credit card provider. But this need not be so. For example, it is envisaged that an ATM machine (or similar apparatus) could be used by people who did not have a credit card account to purchase disposable credit cards, which disposable credit cards could then be used for either card present or remote transactions. When the card had been used, the card would be simply reinserted into the ATM machine, and after a suitable period of time the purchaser's account would be credited with any money not spent. Similarly, if the person who purchases the disposable credit card does not have an account of any sort with the credit card provider, the credit card could still be purchased from the ATM machine and then any refund could take place a sufficient time after the transaction would have been cleared, which refund could be either in the form of a cash refund to the purchaser or to a crediting of that purchaser account with another financial institution.

Similarly, it will be appreciated that the use of an ATM machine is not essential, as the disposable credit cards or single use credit cards could be purchased in the normal way in which one purchases any other goods or services, such as either directly in a face-to-face transaction or by post.

Similarly, while in the above it has been suggested that there could be single use credit cards that would be purchased, there is no reason why they could not be multiple transaction credit cards with an aggregate credit limit. Further, these cards could, instead of being credit cards, be simply credit card numbers for single or multiple use. It is, however, envisaged that for operational efficiency, these numbers are much more likely to be issued as disposable credit cards or single use credit cards. Thus, for those who do not wish to handle a credit card or whose credit worthiness is such that they would not be allowed to have a credit card, it will now be possible for them to have the use of a credit card. This would have considerable advantages for the credit card providers.

2.7 Card Holder Controlled Validity of Credit Card Numbers

In processing a transaction as described above, one step is to determine whether or not a limited use credit/debit/charge card number is valid. As discussed above, when a new credit card is presently issued, it is commonly required that the card holder activate the card. Specifically, the card holder may be required to communicate with the credit card issuer to activate the card before it can be used. Alternatively, in one embodiment of the present system, the card holder can control the activation or validity of a credit card number, or equivalent transaction code, during the course a transaction. Thus, in this embodiment, the card holder has the control, security and confidence that payments can only be made with his or her express permission.

Figure 9:
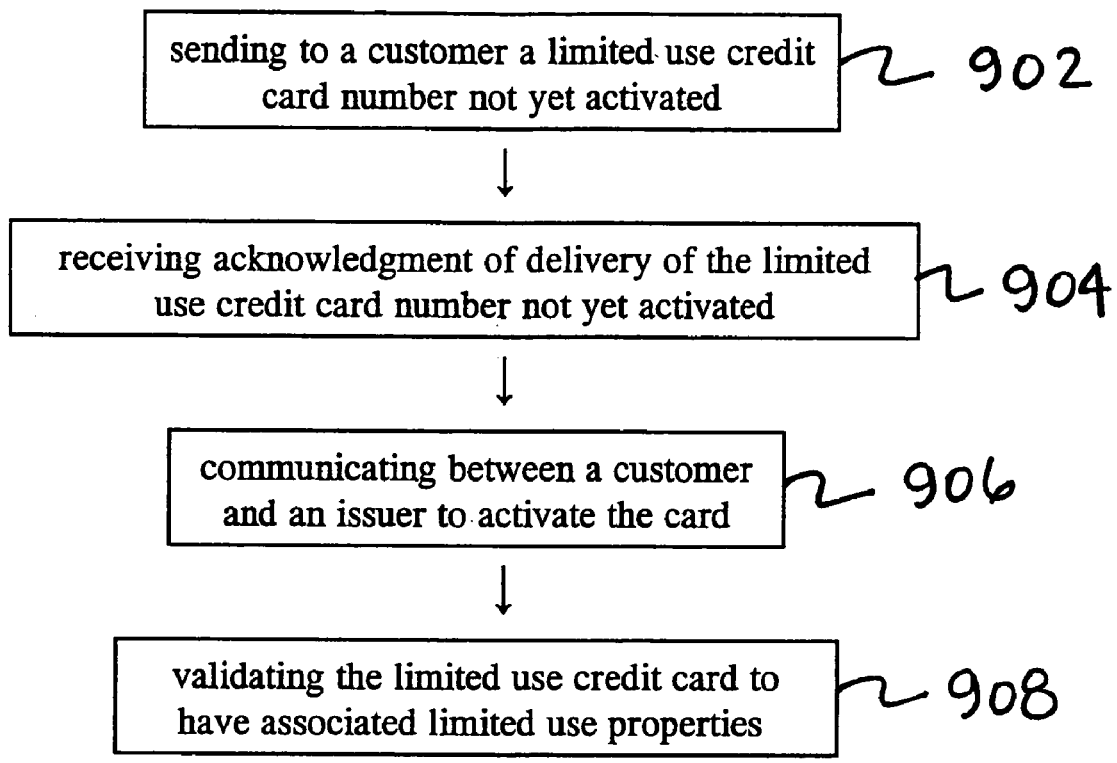
FIG. 9 is a flow chart illustrating an exemplary method of controlling the validity of a limited use credit card number.

FIG. 9 is a flow chart illustrating an exemplary method of controlling the validity of a limited use credit card number. The card holder has a credit card number, or equivalent transaction code, that is allocated to the card holder, but is not yet active. (Step 902). The card holder can acknowledge delivery of the credit card number, but the number remains inactive within the card issuer's processing system, e.g., a bank's processing system. (Step 904). When the card holder wishes to conduct a transaction, he or she contacts the card issuer to activate the credit card number. (Step 906). Activating the credit card number before every transaction is cumbersome, but in the context of a remote transaction for example, via the Internet or equivalent network, the communication between the card holder and the card issuer can be achieved very rapidly by an entirely automated system that will activate the card during the process of conducting a transaction with an Internet based merchant. The credit card number is activated for a specific transaction only when specifically requested by the card holder. (Step 908).

The properties of this validation or activation process can vary. For example, the validation could be for a specific time period, for a specific merchant or group of merchants, for a specific type of transaction, or for a specific number of transactions (authorizations and/or presentments). These properties can also be combined in any permutation. For example, a card holder could request that his or her credit card number be validated for one transaction with a specific merchant up to a specific value limit or value range (e.g., a specific value +/− a configurable range). In the event that no authorization is received within a defined period, the validity can lapse. This combination provides a solution that meets the need for a secure, flexible payment system for remote transactions.

More specifically, for Internet transactions the card holder would receive a software package from the card issuer along with a unique personal validity limited credit card number. This software package would also facilitate completion of the merchants web page using ECML (electronic commerce modeling language) or some other equivalent electronic wallet system. Merchants wishing to use this system provide a unique merchant identification number on their web site. For merchants who are not compliant with such systems, a simpler automated method, e.g., "drag and drop," of transferring card number and other details is supported.

When a card holder wants to conduct a transaction, he or she activates the validity limited credit card software using a password or hardware based user identification system (e.g., magnetic stripe card reader, chip card reader, electronic token generator, fingerprint recognition system or the like) thereby identifying himself or herself with the card issuer. The card holder then requests his or her credit card number to be validated for the merchant as identified by the merchant identification number. After use the card number is automatically inactivated again. The card holder may also specify additional limitations as discussed above, such as value limitations and maximum number of available transactions. Alternatively, these limitations could carry default limitations, for example single transactions up to a value of $100.00. This request would be transmitted via the Internet to the card issuer's card computer processing system. The processing system would validate the card holder's password (or hardware device), if appropriate, and forward the appropriate validity request to the card processing systems database.

The card issuer's server may also verify the merchant's identity by providing confirmation of the merchant's name as it will appear on the card holder's credit card statement. This merchant verification helps to avoid a common source of potential confusion for card holders in credit card transactions. The merchant identification number can either be the actual credit card systems merchant-ID or another unique code. In either case, the credit card merchant-ID that will be transmitted to the processing system during the transaction is entered into the processing system's database. This ensures that only the intended merchant can initiate a transaction with the validated credit card number. In the event that a merchant identification code does not satisfy the card holder's expectations, the card holder has the option to cancel the transaction before any information is passed to the merchant's web site.

When application of the one or more limitations are confirmed, generally within a matter of seconds, the card holder is given verification of such and is allowed to transfer the credit card number and transaction details to the merchant's web site. Since the merchant identification number is used to validate a specific number of transactions for that merchant, there is no benefit of a rogue or fraudulent merchant trying to steal the identity of another valid merchant. The transaction can only be reimbursed to the merchant identified to the card holder by the card issuer's system.

When a merchant receives the card holder's credit card number, the merchant processes this in an identical manner to an existing transaction in known systems. The transaction is passed through to the card issuer's processing system via the merchant acquiring and credit card networks. At the card issuer's processing system, the transaction is handled by an authorization system that allows a card number to have associated validity restrictions or limitations, such as merchant-ID. If, in response to an authorization request, the authorization system indicates a valid card number, with an appropriate merchant-ID validation and sufficient funds, a normal authorization response is returned to the merchant. The number is then deactivated by the use triggered processing software within the authorization system or the in case of a multiple outstanding transactions the properties of the card number are updated to remove the permission for the authorized transaction (e.g. decrement the cumulated value limit). If the authorization system identifies a problem with the request, for example, exceeding a limitation, the merchant is denied authorization. Transaction settlements and card holder billing proceed as described above.

In the situation where a card holder is making multiple purchases with the same merchant within a short period of time, each validation by the card holder may be cumulative so that all the requested transactions can proceed. For example, if the card holder requests two transactions, one of $50.00 and one of $100.00 dollars for a specific merchant, the credit card number will be validated for two transactions to that merchant with a cumulative limit of $150. This means that both transactions will be authorized. In this case, the sequence of authorization requests from the merchant may differ from original sequence of validation requests from the card holder.

This system may be implemented using the internet card software package, or RAD software package, as described herein.

In general, the system provides a method for numbers and accounts to be set up and issued directly to the user. In addition, the system also permits users to directly alter the properties of a credit card account within an issuer's authorization and settlement system. The set-up (issuance) and use of a limited use credit card number can take place at the same time, i.e., in the same interaction or at separate times, i.e., setting up (issuing) a limited use credit card number at one time and configuring the limited use credit card number at a later time.

This system has a number of advantages over existing credit card systems. Card fraud is greatly reduced since a stolen number requires the card holder to validate the card number before any transaction can be completed. This protects against either interception of the number during a transaction or the number being accessed from a merchant's computer systems at a later date. In addition, if the number is authorized, the merchant is assured that the card issuer has directly validated that the card holder has requested the transaction. This prevents or limits a card holder's ability to repudiate the transaction. Moreover, the card holder has additional control on the purchasing power of his or her credit card. The card holder has the reassurance that payment can only be made to the merchant described by the card issuing bank/organization.

2.8 Additional Uses of the Credit Card Numbers

In situations where the card-holder and card issuer are in communication and authentication is required of one or both parties, the list of limited use card numbers held by each party can used as a form of identification. In the manner of a dynamic password all or part of a single limited use number a sequence of such numbers could be used to identify either party without the need for issuing any additional security systems. Since this identification does not need to be handled by conventional transaction systems, all or part of a limited use number can be used for this purpose.

Figure 10:
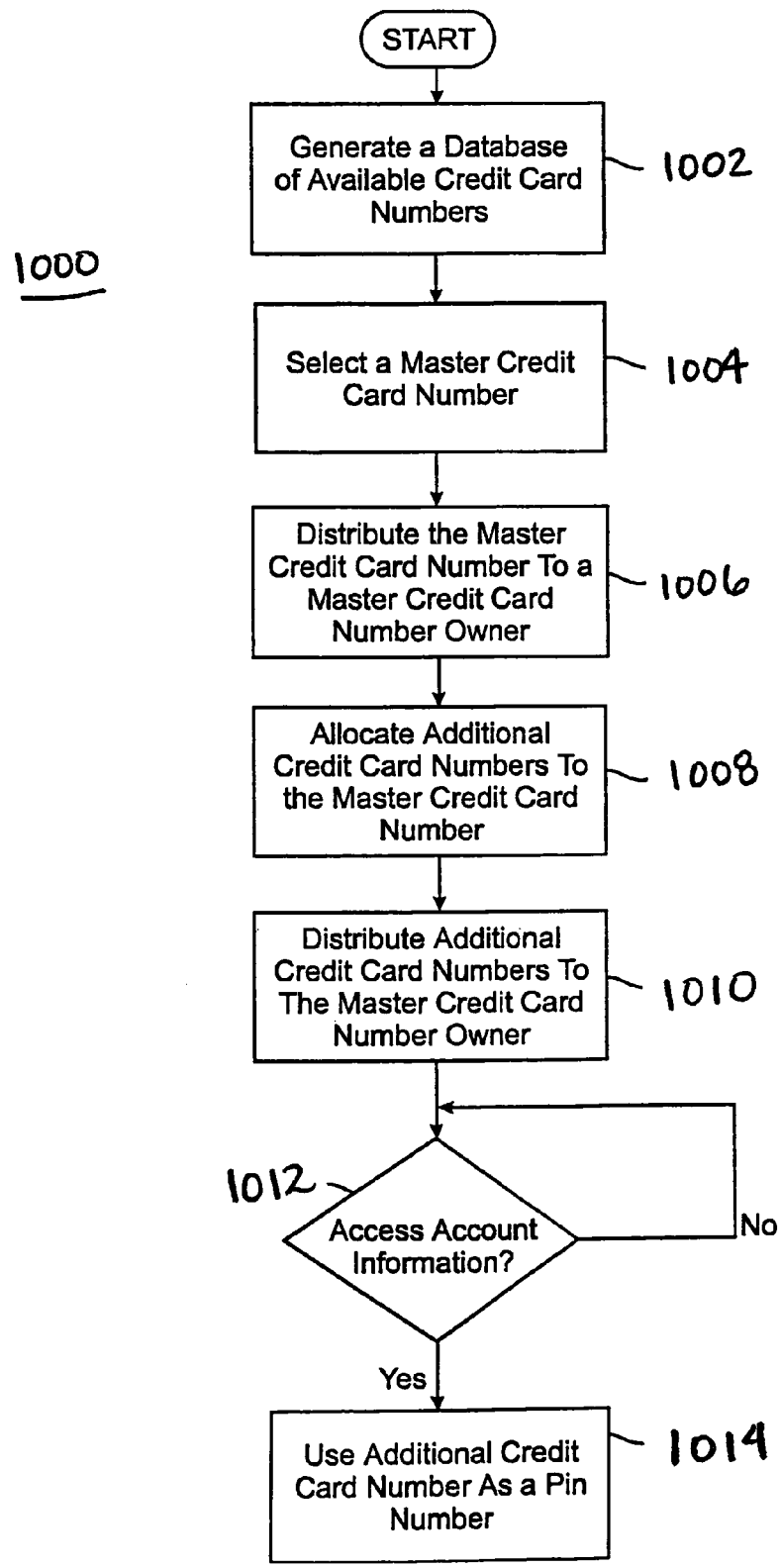
FIG. 10 is a flow chart illustrating an exemplary process for using a credit card number as a PIN number.

FIG. 10 is a flow chart illustrating an exemplary process for using a credit card number as a PIN number. In step 1002, a card issuer generates a database of available credit card numbers. The card issuer selects a master credit card number or more generically master account number (step 1004) and distributes the master account number to a master account number owner. (Step 1006). The card issuer then allocates additional credit card numbers to the master account number (step 1008), and distributes the additional credit numbers to the master account number owner. (Step 1010). When the master credit card number owner needs or desires to access account information (step 1012), the master account owner can use one of the additional credit card numbers as a PIN number. (Step 1014).

As can be readily seen, there are fundamental differences between the system of the present invention and any system that uses a PIN or other number (whether constant or varying from transaction to transaction) to validate a transaction. In the present system the numerical details conveyed in the course of a transaction are identical in format to an existing credit card number but no unique account code is included. This maximizes the security and privacy of a credit/debit/charge card transaction. Within the processing system the validity of the limited use number is verified first and then the associated account identified second by examining information stored with the limited use number. With the transmission of an additional PIN or other number in addition to the account number or other unique identifier, there is a lower level of security and privacy. Within any form of PIN identification (and as described by Rahman) the associated account is identified first and then the PIN verified after this step. For this reason many card holders can share the same PIN, indeed in most cases due to the short length of PIN codes many users do have identical PINs but different account numbers. For our system each limited use number must be unique at the time of use and so the associated account can be uniquely identified.

2.9 System Locations

With reference back to FIG. 1, and as described above, central processing system 100 can internally perform the approval and denial of credit card transactions or this function can be delegated to a separate clearance processing facility. In other words, central processing system can be located within the card issuer's main processing system or at a stand-alone facility. In an exemplary embodiment of the present invention, central processing system 100 adds additional functionality to existing credit/charge/debit card systems without any, or with minimal, alterations. In general, central processing system 100 transmits certain transaction details in a bi-directional manner, i.e., utilizing dual interfaces between central processing system 100 and the merchant and between central processing system 100 and the card issuer, without revealing the master credit card number to the merchant. The dual interface transmissions, referred to herein as remapping, allow merchants and card issuers to handle transaction details in the same manner as conventional credit card transactions. Such conventional credit card transactions may be, for example, authorizations, settlements, copy requests, and charge-backs.

Remapping can be implemented by utilizing database look-up functions using existing industry-standard computer platforms. In addition, remapping may occur by replacing the limited use card number with the master account number.

Figure 11:
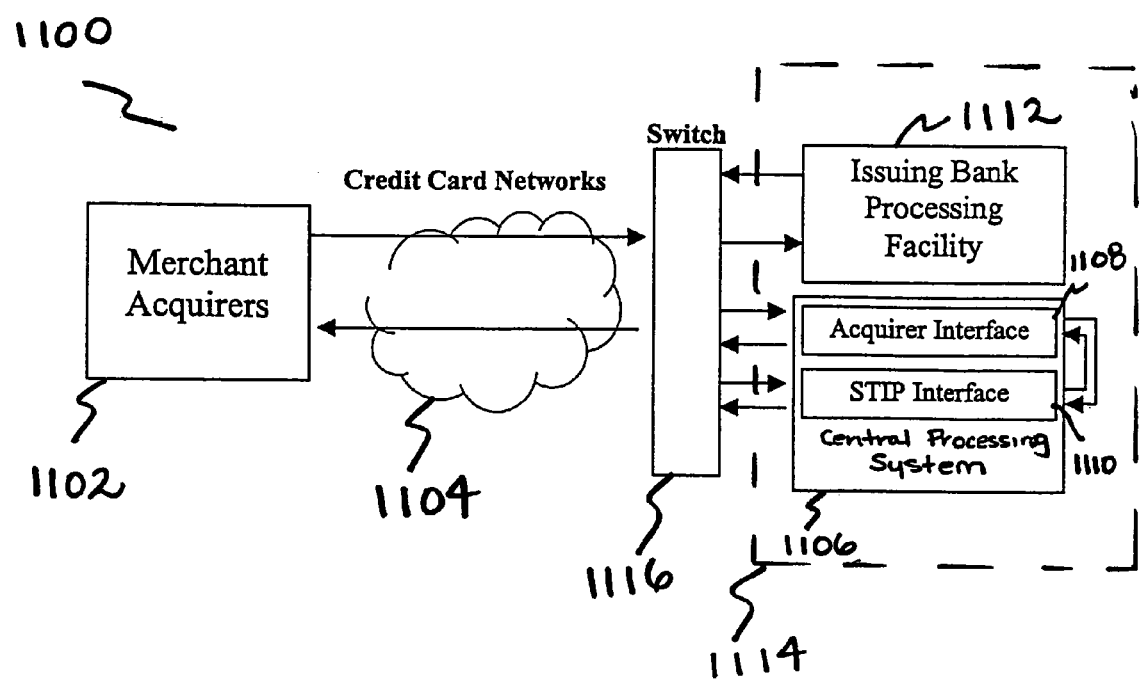
FIG. 11 is a block diagram illustrating an exemplary location for the central processing system.

FIG. 11 is a block diagram illustrating a credit card system 1100 in which a central processing system 1106 in accordance with an embodiment of the present invention is located within a card issuing bank's main processing system 1114. System 1100 includes merchant acquirers 1102 connected to card issuing bank's main processing system 1114 via credit card network 1104 and switch 1116. Credit card network 1104 may be any type of communication network, such as the Internet, a radio network, etc. as described above. Switch 1116 includes hardware and software components. Switch 1116 may be configured to direct incoming transaction details on the basis of the card number and to direct outgoing transaction details on the basis of the merchant acquirer identification number (referred to herein as the "merchant ID"). Issuing bank's main processing system 1114 includes issuing bank processing facility 1112 and central processing system 1106. Central processing system 1106 includes acquirer interface 1108 and STIP interface 1110.

Figure 12:
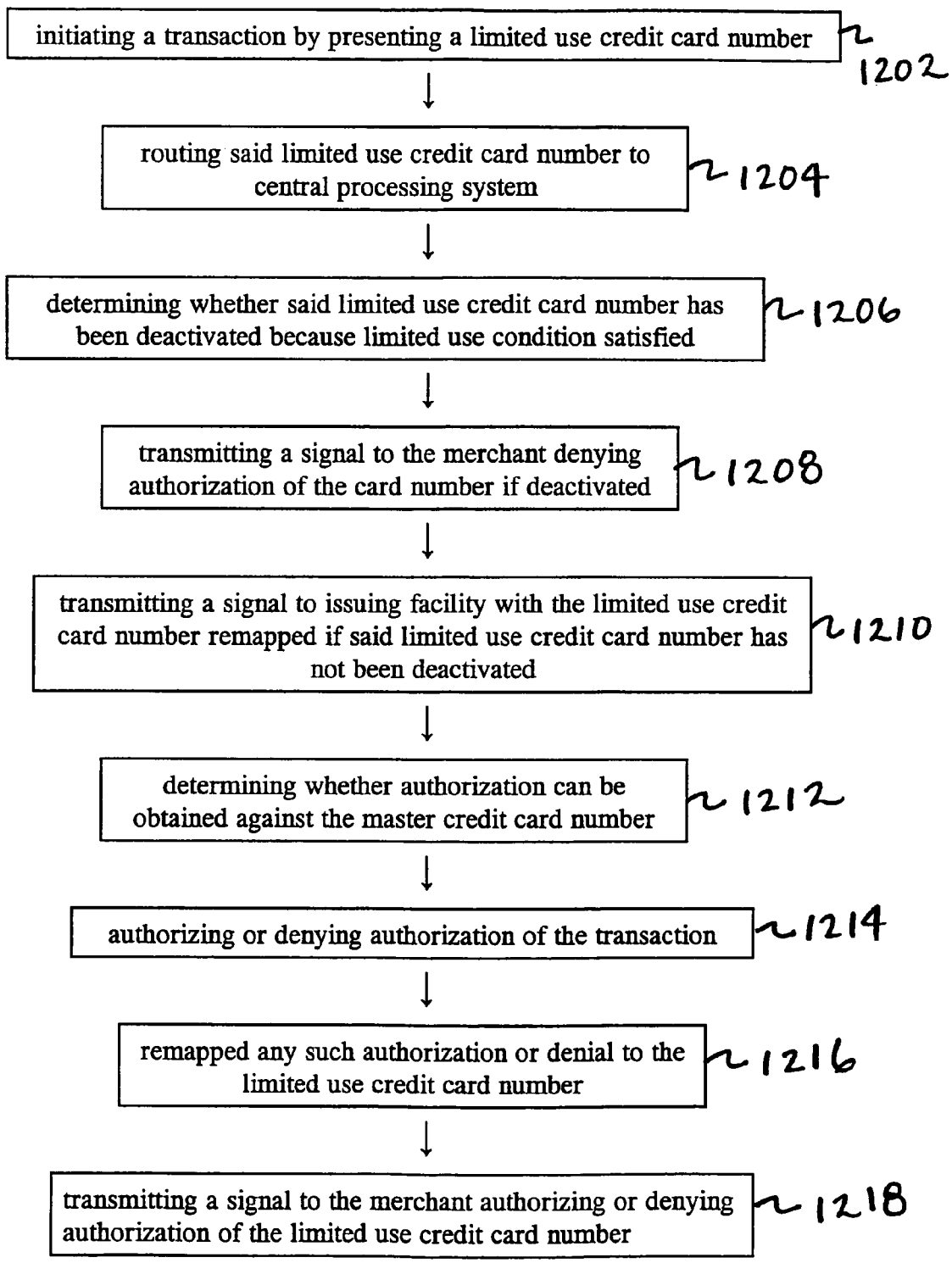
FIG. 12 is a flow chart illustrating an exemplary method of conducting a limited use credit card number transaction.

Exemplary transactions will now be described with reference to FIGS. 11 and 12. FIG. 12 is a flow chart illustrating an exemplary method of conducting a limited use credit card number transaction. A user initiates a transaction by presenting a limited use credit/charge/debit card number, either in person or remotely as discussed above. (Step 1202). Merchant acquirer 1102 routes this limited use credit card number to central processing system 1106 via network 1104 and switch 1116. (Step 1204). This routing is done on the basis of a specific bank identification number (referred to herein as "BIN") which is the first few digits of the limited use credit card number, as discussed above. In this example, central processing system 1106 acts as a stand-in processor.

If the limited use credit card number is invalid, or if the limited use condition has been satisfied, i.e., the condition has been met or exceeded, step 1206, central processing system 1106 will transmit a signal to merchant acquirer 1102 denying authorization of the card number via switch 1116 and network 1104. (Step 1208). If the limited use credit card number is valid, and if the limited use condition has not been satisfied, central processing system 1106 transmits a signal to the issuing processing facility 1112 via merchant acquirer interface 1108 and switch 1116. (Step 1210). This signal includes the original transaction details but the card number and the merchant ID are remapped. This remapping provides the master credit card BIN number so the signal will be routed to processing facility 1112. This ensures that the authorization can be obtained against the master credit card and that any resulting authorization, or denial thereof, is returned to central processing system 1116, as this appears to processing facility 1112 to be the merchant. (Steps 1212 and 1214). The authorization, or denial of authorization, is the remapped within central processing system 1106 to the original limited use credit card number and merchant ID. (Step 1216). Central processing system 1106 then transmits a signal to merchant 1102 authorizing the limited use credit card number, or denying authorization as appropriate, along with the original transaction details via switch 1116 and network 1104. (Step 1218).

Figure 13:
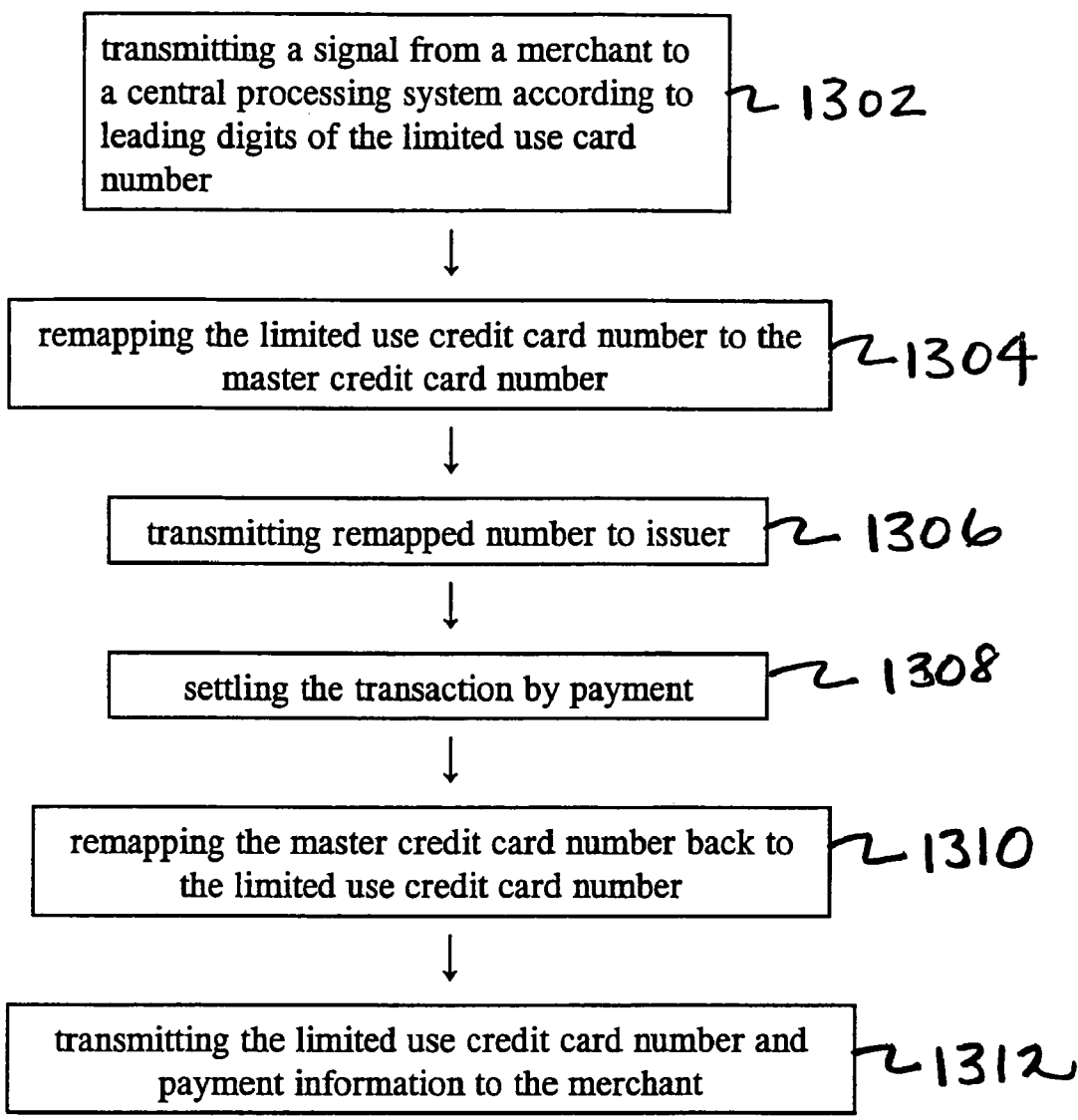
FIG. 13 is a flow chart illustrating an exemplary method of conducting a settlement transaction.

FIG. 13 is a flow chart illustrating an exemplary method of conducting a settlement transaction. In a settlement transaction, merchant 1102 transmits a signal to central processing system 1106 via network 1104 and switch 1116 according to the BIN of the limited use card number. (Step 1302). Central processing system 1106 remaps the limited use credit card number with the master credit card or account number, the merchant ID with a central processing system ID and the merchant text description with a central processing text description, step 1304, and transmits this remapped information to issuer processing facility 1112 via switch 1116, step 1306. Processing facility 1112 settles the transaction by payment, if appropriate, to central processing system 1106. (Step 1308). Central processing system 1106 then remaps the master credit card or account number back to the original limited use credit card number, the central processing ID back to the merchant ID and the central processing text description back to the merchant text description, step 1310, and transmits this information along with the payment, if appropriate, to merchant acquirer 1102 via switch 1116 and network 1104, step 1312. As with the authorization cycle, this settlement cycle ensures that settlement is obtained against the master credit card; that the card holder's billing statement reflects the limited use transaction, with the central processing ID, and that the payment for settlement is conducted through central processing system 1106.

If a card holder challenges or questions a specific charge on his or her billing statement, the copy request or charge back will be routed to central processing system 1106, as this is the ID associated with the transaction. In a similar manner to that described above, central processing system 1106 will remap the copy request or charge back according to the merchant ID and the limited use credit card number and transmit the copy request or the charge back to merchant 1102 via switch 1116 and network 1104. Merchant 1102 transmits the requested copy or the charge back confirmation to central processing system 1106 via network 1104 and switch 1116 according to the BIN of the limited use card number. Central processing system 1106 then remaps the ID and card number information and forwards the requested copy or charge back information to processing facility 1112 via switch 1116.

Figure 14:
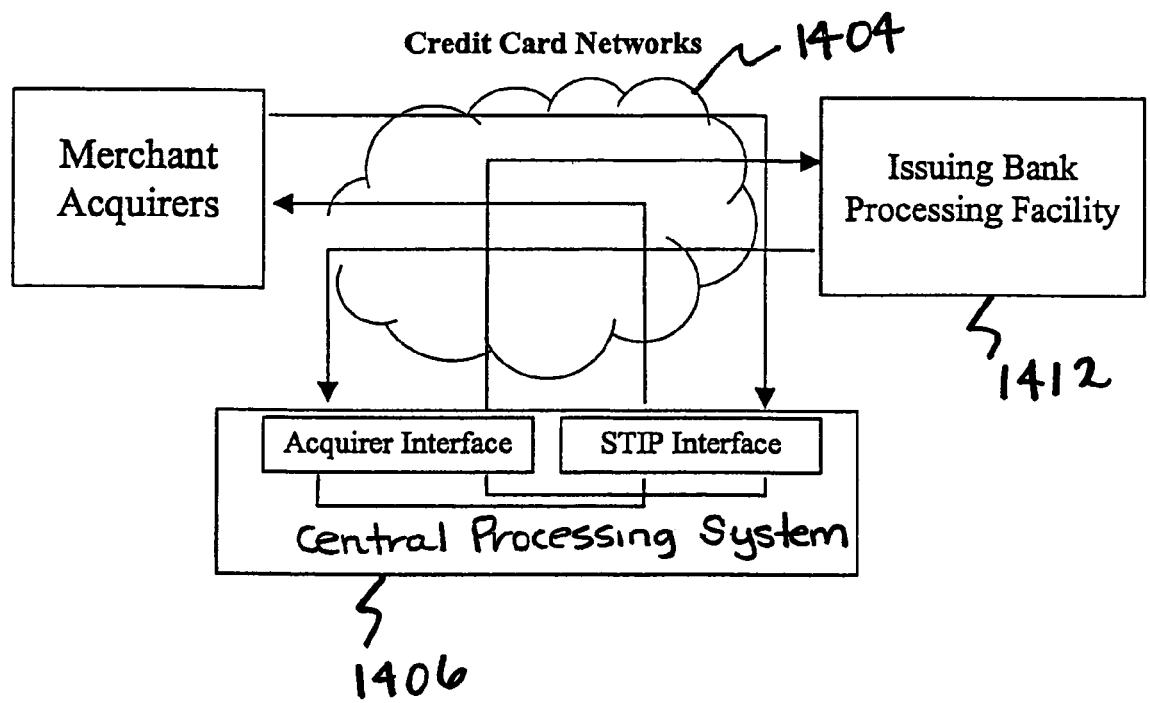
FIG. 14 is a block diagram illustrating an alternate exemplary location for the central processing system.

System 1100 is advantageous in that it reduces communication delays and fees but it requires the addition of switch 1116. Alternatively, FIG. 14 illustrates central processing system 1406 as a stand alone facility. The authorization, settlement, copy request and charge back transactions described above are equally applicable to FIG. 14, except switch 1116 in FIG. 11 is no longer required. FIG. 14 illustrates that communication between central processing system 1406 and card issuing bank's processing facility 1412 can be conducted through existing credit networks 1404. In addition to not requiring a switch, such as switch 1116, in this configuration, a single large central processing system 1406 can offer limited use support to a wide range of issuers, such as bank processing facility 1412. However, this configuration requires increased communication times and potentially increased communication fees.

In another exemplary embodiment, the central processing system could be constructed to be a part of the merchant acquirer, instead of the bank processing facility as shown in FIG. 11. This configuration would also require the addition of a switch like switch 1116 but would reduce communication delays and fees.

The limited use credit card number and remapping system may also be used in connection with organizations other than banks. For example, the limited use credit card number may be linked to organizations such as utilities, Internet service providers, telephone accounts, fixed or mobile, anonymous prepaid accounts and the like. With such other organizations, there would be no remapping to a master credit card number, but rather to some other account number provided by the organization.

Linking a limited use credit card number to other organizations is advantageous for several reasons. First, the organization may have a pre-existing relationship with the user of the limited use credit card number. This relationship provides evidence of the user's credit history with the organization, so no additional credit checks need to be performed, which can be costly and time-consuming for the organization. In addition, because the organization is already providing other services to the user, a billing procedure is already established. The time and cost associated with establishing and implementing billing procedures has already been incurred. Minimal cost and effort is associated with adding a section to a billing statement for a limited use credit card number.

2.10. Remote Access Devices for Accessing Limited Use Numbers

A card holder may desire to access a list of limited use credit/debit/charge card numbers where the limited use cards are not stored on the card holder's own computer. In the context of modern client server architecture this represents one extreme of the situation where all information storage is at the server. The previous description for local storage indicates the situation of a client program with a significant amount of local functionality. Between these two extremes a range of intermediary client server arrangements such as a "thin client" with minimal functionality obtaining limited use numbers from the server as required. The combination of encryption and dynamic passwords, as described herein, or any suitable alternative form of use identification allows a card holder to have "multiple wallets", i.e., a card holder can access limited use numbers from different devices, without the need to transmit credit card numbers.

Figure 15:
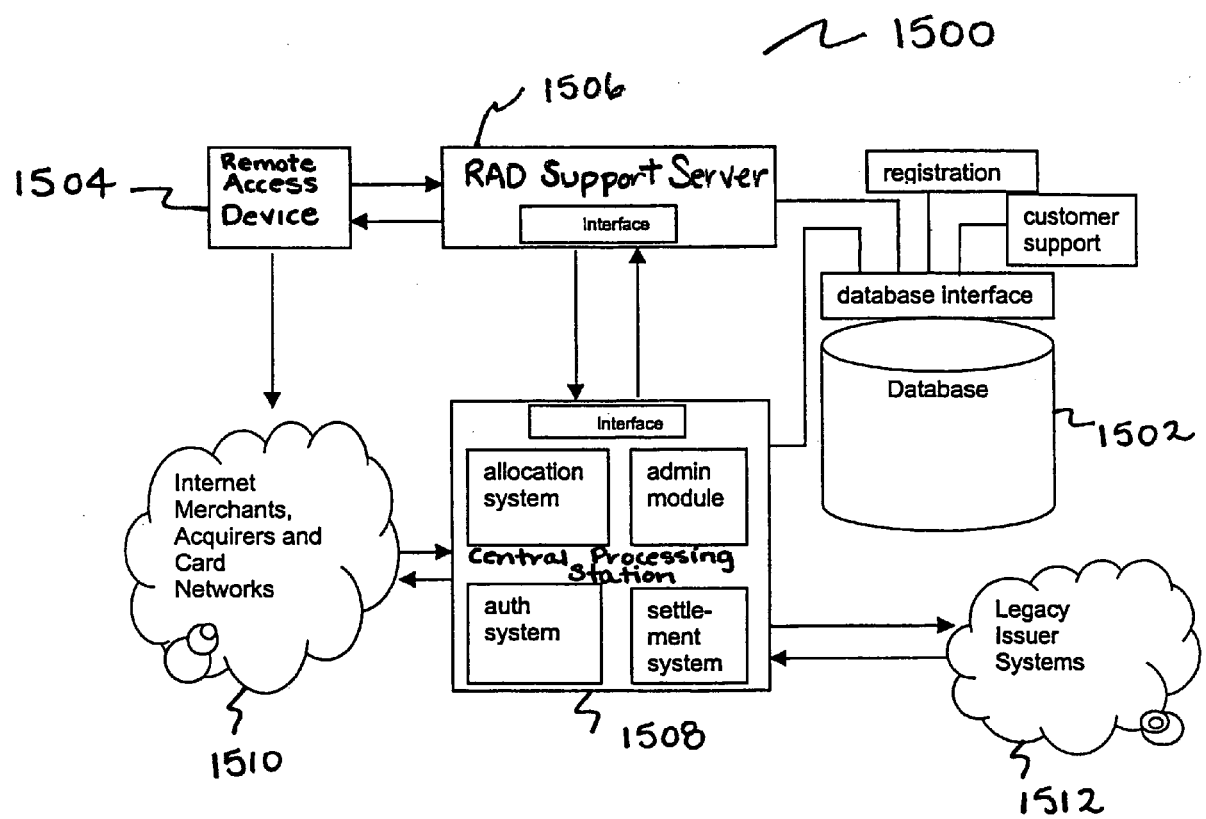
FIG. 15 is a block diagram illustrating an alternate exemplary process for limiting, distributing and using a limited use card number.

As discussed above, software and limited use numbers can be issued via electronic communication media. In one embodiment, a card holder can access limited use credit card numbers during electronic transactions via a Remote Access Device, referred to herein as "RAD", such as the Orbis Internet Card™. The overall layout of the RAD system 1500 is shown in FIG. 15 and a flow chart illustrating an exemplary method of providing remote access devices for accessing limited use credit card numbers is shown in FIG. 16. In general, the operation of the complete system from registration to completion of a transaction follows.

When a user desires to register with RAD system 1500, the user submits user authentication information, the master account number and other identifying data for entry into a database 1502. (Step 1602). To register with RAD system 1500, the user must be a valid holder/user of the master credit card or account number. (Step 1604). Once registered, step 1606, the user obtains a RAD 1504, step 1608. RAD 1504 includes a software package to which enables communication with a remote access device support server, referred to herein as a RAD support server 1506, such as the Nexus User Support Server™, to enable the issuance of limited use card numbers.

When the user initiates communication with RAD support server 1506, step 1610, RAD support server 1506 first authenticates the user, step 1612. If successfully authenticated, the user can then request a limited use number, step 1614 specifying any additional transaction limitations desired as discussed herein, step 1616. RAD support server 1506 issues a request over a network to a central processing station 1508 for a limited use number with the one or more specified limitations. The limited use number provided in response to the request is associated with a specific RAD system user identification previously assigned to the user.

Central processing station 1508 obtains the next available limited use number. (Step 1618). Once obtained, the limited use number, and the specified limitations, is entered into database 1502 such that the limited use number is associated with the user's information already in database 1502. (Step 1620). The limited use number is then transmitted to the RAD support server 1506 for issuance to the user via RAD 1504. (Step 1622). RAD software package 1504 displays the limited use number. The user can transfer this limited use number to a web site for initiating a transaction. Transferring this number to a web site can be achieved by dragging and dropping the number onto the web page, by software-simulated key-stroke entry, by "one-click" methods, or by other suitable methods known to one skilled in the art.

When a merchant 1510 receives a transaction utilizing a limited use number from RAD system 1506, the transaction details are handled in the same manner as an existing number since limited use card numbers share the same format as existing credit card numbers. The transaction details are transferred to the merchant acquirer and then routed onto the appropriate issuer on the basis of the leading digits of the limited use number, i.e., BIN, via central processing station 1508. The BIN is registered with central processing station 1508 to ensure appropriate routing.

As described above, central processing station 1508 verifies the validity of the limited use number and ensures that the transaction meets all specified limitations. If the limited use number is valid and the transaction met the specific limitations, central processing station 1508 enters the master credit card number into the transaction message in place of the limited use number. Central processing station 1508 then transmits the transaction message to the issuer's processing facility 1512 as a normal authorization request. The issuer's processing facility 1512 transmits an authorization for the master card number, if appropriate, to central processing facility 1508. Central processing facility remaps the master card number to the limited use number and the transaction message is transmitted to the originating merchant acquirer and then the merchant. Central processing station 1508 also updates the limitations and validity of the limited use number according to the details of the transaction. The limitation and validity updating is best done following verification of available funds so that a limited use number with a cumulative value limit is only decremented in value if the transaction can be completed. If limitation and validity updating is done prior to checking for the availability/validity of the linked or principal account then certain updates will need to be reversed in the case of a decline on the linked or principal account. This has a small computational overhead. If the authorization was approved by the issuer's processing facility 1512, the user's purchase can proceed as normal. If declined, a decline message is sent to the merchant.

For settlements, the same routing occurs with all transactions deriving from a limited use number obtained from RAD system 1500.

The above described system will now be discussed in greater detail.

RAD system 1500 may be configured to provide the user with many features. RAD system 1500 enables the user to have multiple and different remote devices from which the user may access RAD support server 1506. In addition, it enables a user to have multiple credit card accounts with one or more issuers and to select from amount these multiple accounts. The RAD software package 1504 enables users to have additional passwords associated with an account if desired. The additional passwords can be used, for example, for children and can have additional pre-defined limitations such as a low dollar transaction limits, e.g., $50.00, or merchant class restrictions, e.g., gas stations.

The RAD software package 1504 includes a simple intuitive interface for the ease of the user, the appearance of which may be customizable without modification to the underlying code. RAD 1504 may use images that relate to the front and back of a credit card to provide key areas of functionality. The back of RAD 1504 includes an interactive panel with a magnetic stripe for providing additional information and/or advertising panels. The interactive panel/stripe area provides for password entry and functional selections. Upon activation, the front of RAD 1504 may be configured to provide additional functions, e.g., those required to initiate an on-line purchase. As discussed herein, supplying information required for on-line purchases can be automated in a number of ways including "clicking and transferring" the information, "dragging and dropping" the information, or "one click shopping."

In one embodiment, RAD software package 1504 is configured to issue a sequence of paired numbers which are securely issued and activated and/or decrypted by oral or written authorization, such as the communication of a password. These paired numbers include an identifier code and a mask code. In order to retrieve a limited use number, a user at a remote device identifies himself or herself using his or her RAD software 1504 by transmitting the identifier code, such as a dynamic password to RAD support server 1506. RAD support server 1506 compares the identifier code with the particular RAD software package 1504 and accepts, or validates, the identifier code if appropriate. If valid, RAD support server 1506 determines the matching mask code for that identifier code from database 1502. RAD support server 1506 uses the mask code to encrypt the limited use card number as described above, and transmits this encrypted code to the user. RAD software 1504 decrypts the encrypted code using the known mask code and reconstructs the initial digits, the BIN number and the checksum digit. RAD software 1504 then arranges this information and reconstructs the limited use card number.

RAD support server 1506 is an Internet based server that interfaces the RAD 1504 and central processing station 1508. RAD support server 1506 receives requests for limited use numbers from users, validates each user, if appropriate, and supplies and validates limited use card numbers with specific limitations, as requested by each user, if appropriate. Such requests may be processed in any desired order, e.g., first come first served basis. RAD support server 1506 may also be configured to provide for location identification verification, secure delivery of limited use numbers, automated completion of payment fields in a merchant's web page order form, review of previous transactions, access to additional issuer services and advertising. The RAD location identification verification is verifying the physical source of the request for a limited use number, e.g., home, office, ATM machine. This additional identification is evidence to limit a user's ability to deny a transaction. The RAD support server 1508 can be configured to require additional identification of the user if the RAD is being used from a physical source which is unknown to the RAD support server or which has not been previously associated with the RAD by the user.

To accomplish the above tasks, RAD support server 1506 should have a high bandwidth Internet connection and highly secure firewalls to insulate critical information from undesired access. Communications between RAD support server 1506 and RAD 1504 is may be Internet based. Communication between RAD support server 1506 and central processing station 1508 and database 1502 may be secured via private networks for additional security. In addition, to provide for additional security, RAD support server 1506, central processing station 1508 and database 1502 may be located at the same physical location, for example, the issuer's processing facility or some other facility which meets the standards set for banking processing facilities.

Communication between RAD 1504 and RAD support server 1506 can use industry standard security protocols appropriate to the platform. For example, secure socket layer (SSL) encryption may be used in the case of communication by a personal computer of the Internet. Alternatively, one of the encryption schemes described herein may be implemented alone or in combination with password protection and/or smart card user authentication. Such communication security can be selectable by the issuer. For example, issuers can select what type of communication security they desire from a range of options.

While the foregoing description makes reference to particular illustrative embodiments, these examples should not be construed as limitations. Not only can the inventive system be modified for other card numbered systems; it can also be modified for other computer networks or numbering schemes. Thus, the present invention is not limited to the disclosed embodiments, but is to be accorded the widest scope consistent with the claims below.

What is claimed:

1. In a financial transaction system capable of using at least one limited use credit card number, which is associated with a master account number of a customer and deactivated upon a use-triggered condition which occurs subsequent to assignment of the at least one limited use credit card number, a method of processing a transaction initiated by a customer presenting the limited use credit card number to a merchant, the method comprising the steps of:

receiving in a central processing system said limited use credit card number electronically routed from the merchant;

determining electronically whether said limited use credit card number has been deactivated because at least one use-triggered condition has been satisfied;

electronically transmitting a signal to a facility which issued the limited use credit card number, the signal including original transaction details but with the limited use credit card number remapped to be a master account number if the limited use credit card number has not been deactivated;

electronically determining whether authorization can be obtained against the master account number;

electronically remapping the results of the authorization determining step to the limited use credit card number for transmission to the merchant; and electronically transmitting a signal to the merchant with the results of the authorization determining step for the limited use credit card number.

2. The method of claim 1, wherein the limited credit card number is linked to an organization selected from a group consisting of: a utility, a public network service provider, a telephone company, a bank account, a prepaid account and a credit card issuer.

3. The method of claim 2, further comprising:

transmitting a signal to the organization which is linked to the limited use credit card number, the signal including original transaction details if the limited use credit card number has not been deactivated;

performing a credit check to determine whether authorization can be obtained against the limited use credit card number; and transmitting a signal to the merchant with the results of the authorization determining step for the limited use credit card number.

4. The method of claim 1, further comprising:

transmitting a signal to the merchant denying authorization if the limited use credit card number has been deactivated.

5. The method of claim 1, further comprising authorizing the transaction based on the results of the authorization determining step.

6. The method of claim 1, further comprising declining authorization of the transaction based on the results of the authorization determining step.

7. The method of claim 1, wherein the master account number is a master credit card account number.

8. The method of claim 1, wherein the use-triggered condition is satisfied when a predetermined number of uses of the limited use credit card number is reached.

9. The method of claim 8, wherein the predetermined number is one.

10. The method of claim 1, wherein a limited use associated with the limited use credit card number permits multiple transactions, and the use-triggered condition is satisfied when the aggregate value of the transactions exceeds a predetermined sum.

11. The method of claim 1, wherein a limited use associated with the limited use credit card number limits use of the card to a specific class of use.

12. In a financial transaction system capable of using at least one limited use credit card number which is deactivated upon a use-triggered condition which occurs subsequent to assignment of the at least one credit card number and which is associated with the master account number of a customer, a method of conducting a settlement transaction comprising the steps of:

electronically receiving a signal transmitted from a merchant according to leading digits of the limited use card number;

electronically remapping the limited use credit card number with the master account number;

electronically transmitting said remapped master account number to an issuer processing facility which issued the master account number;

receiving payment for settling the transaction, if appropriate;

electronically remapping the master account number back to the limited use credit card number; and electronically transmitting the limited use credit card number and payment information, if appropriate, to the merchant.

13. The method of claim 12, wherein the master account number is a master credit card account number.

14. The method of claim 12, wherein the use-triggered condition is satisfied when a predetermined number of uses of the limited use credit card number is reached.

15. The method of claim 14, wherein the predetermined number is one.

16. The method of claim 12, wherein a limited use associated with the limited use credit card number permits multiple transactions, and the use-triggered condition is satisfied when the aggregate value of the transactions exceeds a predetermined sum.

17. The method of claim 12, wherein a limited use associated with the limited use credit card number limits use of the card to a specific class of use.

18. In a financial transaction system capable of using at least one limited use credit card number, which is deactivated upon a use-triggered condition which occurs subsequent to assignment of the at least one limited use credit card number and is associated with a master credit card number, a method of conducting a transaction involving the limited use credit card comprising the steps of:

initiating a transaction by a customer presenting a limited use credit card number to a merchant electronically or in person;

electronically routing said limited use credit card number to a central processing system;

electronically determining whether said limited use credit card number has been deactivated because at least one use-triggered condition has been satisfied;

electronically transmitting a signal to a master credit card issuing facility which issued the limited use credit card number, the signal including original transaction details but with the limited use credit card number remapped to be the master credit card number if the limited use credit card number has not been deactivated;

electronically determining whether authorization can be obtained against the master credit card number;

electronically remapping the results of the authorization determining step to the limited use credit card number for transmission to the merchant; and electronically transmitting a signal to the merchant with the results of the authorization determining step for the limited use credit card number.

* * * * *

UNITED STATES PATENT AND TRADEMARK OFFICE
CERTIFICATE OF CORRECTION

PATENT NO. : 7,571,142 B1 Page 1 of 1
APPLICATION NO. : 09/506830
DATED : August 4, 2009
INVENTOR(S) : Daniel Flitcroft et al.

It is certified that error appears in the above-identified patent and that said Letters Patent is hereby corrected as shown below:

On the title page, insert item:

--(30) Foreign Application Priority Data

June 15, 1998 (IE)..............................S98 0458
May 7, 1998 (IE)...............................S98 0346
March 25, 1998 (IE)..........................S98 0223--

Signed and Sealed this

Sixteenth Day of March, 2010

David J. Kappos
*Director of the United States Patent and Trademark Office*